(12) United States Patent
Son et al.

(10) Patent No.: US 12,345,953 B2
(45) Date of Patent: Jul. 1, 2025

(54) OPTICAL IMAGING SYSTEM

(71) Applicant: Samsung Electro-Mechanics Co., Ltd., Suwon-si (KR)

(72) Inventors: Ju Hwa Son, Suwon-si (KR); Min Hyuk Im, Suwon-si (KR); Ga Young An, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/638,928

(22) Filed: Apr. 18, 2024

(65) Prior Publication Data

US 2024/0264408 A1 Aug. 8, 2024

Related U.S. Application Data

(63) Continuation of application No. 18/305,425, filed on Apr. 24, 2023, now Pat. No. 11,994,749, which is a
(Continued)

(30) Foreign Application Priority Data

Jun. 26, 2018 (KR) .......................... 10-2018-0073614
Jan. 29, 2019 (KR) .......................... 10-2019-0011429

(51) Int. Cl.
*G02B 9/64* (2006.01)
*G02B 7/02* (2021.01)
*G02B 27/00* (2006.01)

(52) U.S. Cl.
CPC .................. *G02B 9/64* (2013.01); *G02B 7/02* (2013.01); *G02B 27/0025* (2013.01)

(58) Field of Classification Search
CPC ........ G02B 9/64; G02B 7/02; G02B 27/0025; G02B 7/021; G02B 7/022; G02B 13/0045;
(Continued)

(56) References Cited

U.S. PATENT DOCUMENTS 9,835,822 B2 12/2017 Huang
10,585,265 B2 3/2020 Jhang et al.
(Continued)

FOREIGN PATENT DOCUMENTS

CN 205665457 U 10/2016
CN 106443986 A 2/2017
(Continued)

OTHER PUBLICATIONS

Machine translation of WO 2019233160 A1 (Year: 2019).*
(Continued)

*Primary Examiner* — Darryl J Collins
*Assistant Examiner* — Matthew Y Lee
(74) *Attorney, Agent, or Firm* — NSIP Law

(57) ABSTRACT

An optical imaging system includes a first lens having a positive refractive power; a second lens having a refractive power; a third lens having a refractive power; a fourth lens having a refractive power and a concave image-side surface; a fifth lens having a refractive power; a sixth lens having a refractive power; a seventh lens having a refractive power; and an eighth lens having a refractive power and a concave object-side surface, wherein the first to eighth lenses are sequentially disposed in numerical order along an optical axis of the optical imaging system from an object side of the optical imaging system toward an imaging plane of the optical imaging system.

13 Claims, 23 Drawing Sheets

Related U.S. Application Data continuation of application No. 17/726,717, filed on Apr. 22, 2022, now Pat. No. 11,668,905, which is a continuation of application No. 16/438,974, filed on Jun. 12, 2019, now Pat. No. 11,340,424.

(58) Field of Classification Search
CPC ............ G02B 13/0015; G02B 13/0055; G02B 13/18
See application file for complete search history.

(56) References Cited

U.S. PATENT DOCUMENTS

| | | | |
|---|---|---|---|
| 10,725,269 | B2 | 7/2020 | Hsieh et al. |
| 2012/0113532 | A1* | 5/2012 | Lee ..................... G02B 13/06 359/753 |
| 2015/0168698 | A1* | 6/2015 | Asami ............... G02B 27/0025 359/684 |
| 2016/0377844 | A1* | 12/2016 | Cheng ................. G02B 13/143 359/355 |
| 2017/0045714 | A1* | 2/2017 | Huang ..................... G02B 9/64 |
| 2017/0052350 | A1* | 2/2017 | Chen .................. G02B 13/0045 |
| 2017/0329108 | A1 | 11/2017 | Hashimoto |
| 2018/0074299 | A1 | 3/2018 | Huang |
| 2018/0143411 | A1* | 5/2018 | Minefuji ................. G02B 9/64 |
| 2018/0180856 | A1 | 6/2018 | Jung et al. |
| 2018/0239117 | A1* | 8/2018 | Lee .................. G02B 27/0025 |
| 2019/0056568 | A1 | 2/2019 | Huang |
| 2019/0101729 | A1 | 4/2019 | Hsieh et al. |
| 2019/0121098 | A1 | 4/2019 | Zhou et al. |
| 2019/0204558 | A1 | 7/2019 | Jhang et al. |
| 2019/0204559 | A1 | 7/2019 | Jhang et al. |
| 2020/0201002 | A1 | 6/2020 | Xu et al. |
| 2020/0209506 | A1 | 7/2020 | Liu et al. |
| 2020/0249439 | A1 | 8/2020 | Song et al. |

FOREIGN PATENT DOCUMENTS

| | | | |
|---|---|---|---|
| CN | 107643586 | A | 1/2018 |
| CN | 107703609 | A | 2/2018 |
| CN | 107741630 | A | 2/2018 |
| CN | 207164344 | U | 3/2018 |
| CN | 207424361 | U | 5/2018 |
| CN | 108107545 | A | 6/2018 |
| CN | 108254890 | A | 7/2018 |
| JP | H06-118302 | A | 4/1994 |
| WO | WO-2019233160 | A1 * | 12/2019 ......... G02B 13/0045 |

OTHER PUBLICATIONS

Chinese Office Action issued on Mar. 3, 2021, in counterpart Chinese Patent Application No. 201910504868.8 (12 pages in English and 11 pages in Chinese).

Chinese Office Action dated Aug. 9, 2021 issued in counterpart Chinese Patent Application No. 201910504868.8 (10 pages in English and 9 pages in Chinese).

Chinese Office Action issued on Jan. 30, 2022 in the corresponding Chinese Patent Application No. 201910504868.8 (10 pages in English language and 9 pages in Chinese language).

Chinese Office Action issued on Mar. 1, 2024, in counterpart Chinese Patent Application No. 202210904861.7 (4 pages in English, 7 pages in Chinese).

Korean Office Action issued on May 3, 2024, in counterpart Korean Patent Application No. 10- 2019-0011429 (5 pages in English, 5 pages in Korean).

* cited by examiner

OPTICAL IMAGING SYSTEM

CROSS-REFERENCE TO RELATED APPLICATIONS

This application is a Continuation Application of U.S. patent application Ser. No. 18/305,425, filed on Apr. 24, 2023, now U.S. Pat. No. 11,994,749 issued on May 28, 2024, which is a Continuation Application of U.S. patent application Ser. No. 17/726,717, filed on Apr. 22, 2022, now U.S. Pat. No. 11,668,905 issued on Jun. 6, 2023, which is a Continuation Application of U.S. patent application Ser. No. 16/438,974, filed on Jun. 12, 2019, now U.S. Pat. No. 11,340,424 issued on May 24, 2022, which claims the benefit under 35 USC 119 (a) of Korean Patent Applications Nos. 10-2018-0073614 filed on Jun. 26, 2018, and 10-2019-0011429 filed on Jan. 29, 2019, in the Korean Intellectual Property Office, the entire disclosures of which are incorporated herein by reference for all purposes.

BACKGROUND

1. Field

This application relates to an optical imaging system including eight lenses.

2. Description of Related Art

A mobile terminal is commonly provided with a camera for video communications or capturing images. However, it is difficult to achieve high performance in a camera for a mobile terminal due to space limitations inside the mobile terminal.

Accordingly, a demand for an optical imaging system capable of improving the performance of the camera without increasing a size of the camera has increased as a number of mobile terminals provided with a camera has increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power; a second lens having a refractive power; a third lens having a refractive power; a fourth lens having a refractive power and a concave image-side surface; a fifth lens having a refractive power; a sixth lens having a refractive power; a seventh lens having a refractive power; and an eighth lens having a refractive power and a concave object-side surface, wherein the first to eighth lenses are sequentially disposed in numerical order along an optical axis of the optical imaging system from an object side of the optical imaging system toward an imaging plane of the optical imaging system.

The second lens may have a negative refractive power.
An object-side surface of the third lens may be convex.
An object-side surface of the fifth lens may be concave.
An image-side surface of the sixth lens may be convex.
An object-side surface of the seventh lens may be concave.

The optical imaging system may satisfy $0.1 < L1w/L8w < 0.3$, where L1w is a weight of the first lens, L8w is a weight of the eighth lens, and L1w and L8w are expressed in a same unit of measurement.

The optical imaging system may further include a spacer disposed between the seventh lens and the eighth lens, and the optical imaging system may satisfy $1.0 < S7d/f < 1.4$, where S7d is an inner diameter of the spacer, f is an overall focal length of the optical imaging system, and S7d and f are expressed in a same unit of measurement.

The optical imaging system may satisfy $0.4 < L1TD/L8TD < 0.8$, where L1TD is an overall outer diameter of the first lens, L8TD is an overall outer diameter of the eighth lens, and L1TD and L8TD are expressed in a same unit of measurement.

The optical imaging system may satisfy $0.4 < L1234TDavg/L8TD < 0.8$, where L1234TDavg is an average value of overall outer diameters of the first to fourth lenses, L8TD is an overall outer diameter of the eighth lens, and L1234TDavg and L8TD are expressed in a same unit of measurement.

The optical imaging system may satisfy $0.5 < L12345TDavg/L8TD < 0.8$, where L12345TDavg is an average value of overall outer diameters of the first to fifth lenses, L8TD is an overall outer diameter of the eighth lens, and L12345TDavg and L8TD are expressed in a same unit of measurement.

The optical imaging system may satisfy $(V2+V4)/2 < 20$, where V2 is an Abbe number of the second lens, and V4 is an Abbe number of the fourth lens.

The optical imaging system may satisfy $50 < (V5+V6+V7+V8)/4$, where V5 is an Abbe number of the fifth lens, V6 is an Abbe number of the sixth lens, V7 is an Abbe number of the seventh lens, and V8 is an Abbe number of the eighth lens.

The optical imaging system may satisfy $1.6 < Nd2 < 1.8$, where Nd2 is an index of refraction of the second lens.

The optical imaging system may satisfy $1.6 < Nd4 < 1.8$, where Nd4 is an index of refraction of the fourth lens.

In another general aspect, an optical imaging system includes a first lens having a refractive power; a second lens having a refractive power; a third lens having a refractive power; a fourth lens having a refractive power; a fifth lens having a positive refractive power and a convex image-side surface; a sixth lens having a positive refractive power and a convex image-side surface; a seventh lens having a refractive power; and an eighth lens having a negative refractive power, wherein the first to eighth lenses are sequentially disposed in numerical order along an optical axis of the optical imaging system from an object side of the optical imaging system toward an imaging plane of the optical imaging system.

Each of the first and third lenses may have a positive refractive power, and each of the second and eighth lenses may have a negative refractive power.

Each of the first to fourth lenses may have a convex object-side surface and a concave image-side surface.

Each of the fifth, seventh, and eighth lenses may have a concave object-side surface, the seventh lens may have a convex image-side surface, and the eighth lens may have a concave image-side surface.

The optical imaging system may satisfy $1.0 < TTL/f1 < 1.4$, where TTL is a distance along the optical axis from an object-side surface of the first lens to the imaging plane, f1 is a focal length of the first lens, and TTL and f1 are expressed in a same unit of measurement.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
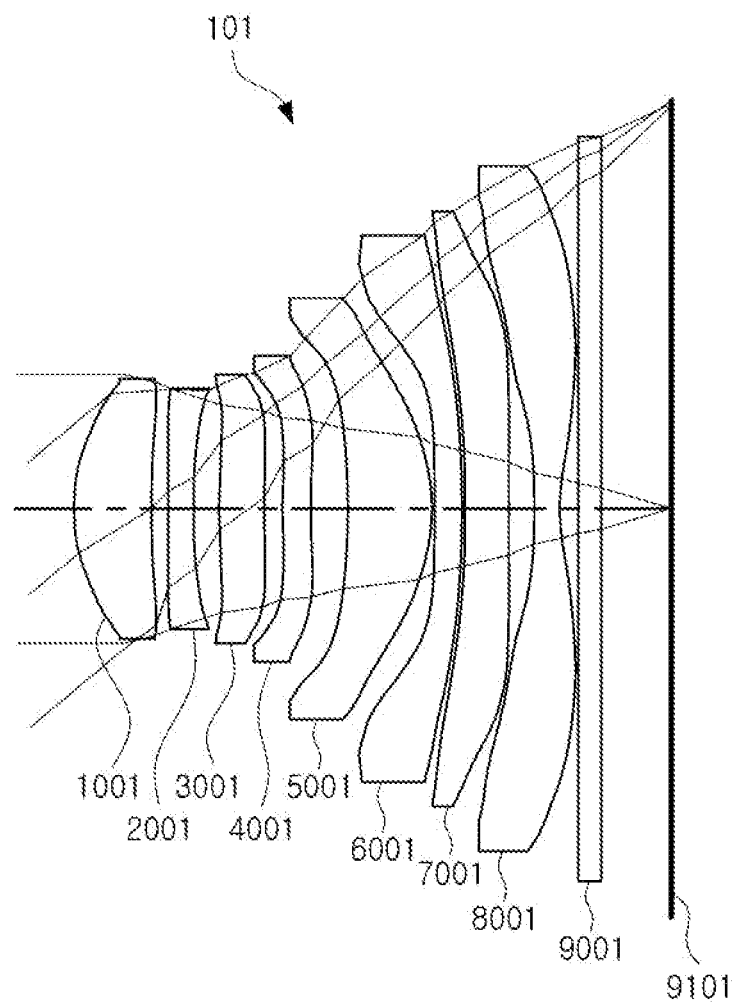
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Thickness, sizes, and shapes of lenses illustrated in the drawings may have been slightly exaggerated for convenience of explanation. In addition, the shapes of spherical or aspherical surfaces of the lenses described in the detailed description and illustrated in the detailed description or the drawings are merely examples. That is, the shapes of the spherical surfaces or the aspherical surfaces of the lenses are not limited to the examples described herein.

Numerical values of radii of curvature, thicknesses, distances between elements including lenses or surfaces, effective aperture radii of lenses, focal lengths, and diameters, thicknesses, and lengths of various elements are expressed in millimeters (mm), and angles are expressed in degrees. Thicknesses of lenses and distances between elements including lenses or surfaces are measured along the optical axis of the optical imaging system.

The term "effective aperture radius" as used in this application refers to a radius of a portion of a surface of a lens or other element (an object-side surface or an image-side surface of a lens or other element) through which light actually passes. The effective aperture radius is equal to a distance measured perpendicular to an optical axis of the surface between the optical axis of the surface and the outermost point on the surface through which light actually passes. Therefore, the effective aperture radius may be equal to a radius of an optical portion of a surface, or may be smaller than the radius of the optical portion of the surface if light does not pass through a peripheral portion of the optical portion of the surface. The object-side surface and the image-side surface of a lens or other element may have different effective aperture radii.

In this application, unless stated otherwise, a reference to the shape of a lens surface means the shape of a paraxial region of the lens surface. A paraxial region of a lens surface is a central portion of the lens surface surrounding the optical axis of the lens surface in which light rays incident to the lens surface make a small angle θ to the optical axis and the approximations $\sin \theta \approx \theta$, $\tan \theta \approx \theta$, and $\cos \theta \approx 1$ are valid.

For example, a statement that the object-side surface of a lens is convex means that at least a paraxial region of the object-side surface of the lens is convex, and a statement that the image-side surface of the lens is concave means that at least a paraxial region of the image-side surface of the lens is concave. Therefore, even though the object side-surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

Next, a configuration of the optical imaging system will be described.

An optical imaging system includes a plurality of lenses. For example, the optical imaging system includes a first lens, a second lens, a third lens, a fourth lens, a fifth lens, a sixth lens, a seventh lens, and an eighth lens sequentially disposed in numerical order along an optical axis of the optical imaging system from an object side of the optical imaging system toward an imaging plane of the optical imaging system. The first lens is a lens closest to an object (or a subject) to be imaged by the optical imaging system, while the eighth lens is a lens closest to the imaging plane.

Each lens of the optical imaging system includes an optical portion and a rib. The optical portion of the lens is a portion of the lens that is configured to refract light, and is generally formed in a central portion of the lens. The rib of the lens is an edge portion of the lens that enables the lens to be mounted in a lens barrel and the optical axis of the lens to be aligned with the optical axis of the optical imaging system. The rib of the lens extends radially outward from the optical portion, and may be formed integrally with the optical portion. The optical portions of the lenses are generally not in contact with each other. For example, the first to eighth lenses are mounted in the lens barrel so that they are spaced apart from one another by predetermined distances along the optical axis of the optical imaging system. The ribs of the lenses may be in selective contact with each other. For example, the ribs of the first to fourth lenses, or the first to fifth lenses, or the second to fourth lenses, may be in contact with each other so that the optical axes of these lenses may be easily aligned with the optical axis of the optical imaging system.

Next, a configuration of the optical imaging system will be described.

The optical imaging system includes a plurality of lenses. For example, the optical imaging system includes a first lens, a second lens, a third lens, a fourth lens, a fifth lens, a sixth lens, a seventh lens, and an eighth lens sequentially disposed in numerical order along an optical axis of the optical imaging system from an object side of the optical imaging system toward an imaging plane of the optical imaging system.

The optical imaging system further includes an image sensor and a filter. The image sensor forms an imaging plane, and converts light refracted by the first to eighth lenses into an electrical signal. The filter is disposed between the lens and the imaging plane, and blocks infrared rays contained in the light refracted by the first to eighth lenses from being incident on the imaging plane.

The optical imaging system further includes a stop and spacers. The stop is disposed in front of the first lens, or between two adjacent lenses of the first to eighth lenses, or between an object-side surface and an image-side surface of one of the first to eighth lenses, to adjust an amount of light incident on the imaging plane. Each of the spacers is disposed at a respective position between two lenses of the first to eighth lenses to maintain a predetermined distance between the two lenses. In addition, the spacer may be made of a light-shielding material to block extraneous light penetrating into the ribs of the lenses. There may be seven or eight spacers. For example, a first spacer is disposed between the first lens and the second lens, a second spacer is disposed between the second lens and the third lens, a third spacer is disposed between the third lens and the fourth lens, a fourth spacer is disposed between the fourth lens and the fifth lens, a fifth spacer is disposed between the fifth lens and the sixth lens, a sixth spacer is disposed between the sixth lens and the seventh lens, and a seventh spacer is disposed between the seventh lens and the eighth lens. In addition, the optical imaging system may further include an eighth spacer disposed between the seventh lens and the seventh spacer.

Next, the lenses of the optical imaging system will be described.

The first lens has a refractive power. For example, the first lens may have a positive refractive power. One surface of the first lens may be convex. For example, an object-side surface of the first lens may be convex. One surface of the first lens may be concave. For example, an image-side surface of the first lens may be concave. The first lens may have an aspherical surface. For example, one surface or both surfaces of the first lens may be aspherical.

The second lens has a refractive power. For example, the second lens may have a negative refractive power. One surface of the second lens may be convex. For example, an object-side surface of the second lens may be convex. One surface of the second lens may be concave. For example, an image-side surface of the second lens may be concave. The second lens may include an aspherical surface. For example, one surface or both surfaces of the second lens may be aspherical.

The third lens has a refractive power. For example, the third lens may have a positive refractive power. One surface of the third lens may be convex. For example, an object-side surface of the third lens may be convex. One surface of the third lens may be concave. For example, an image-side surface of the third lens may be concave. The third lens may have an aspherical surface. For example, one surface or both surfaces of the third lens may be aspherical.

The fourth lens has a refractive power. For example, the fourth lens may have a positive refractive power or a negative refractive power. One surface of the fourth lens may be convex. For example, an object-side surface of the fourth lens may be convex. One surface of the fourth lens may be concave. For example, an image-side surface of the fourth lens may be concave. The fourth lens may have at least one inflection point. An inflection point is a point where a lens surface changes from convex to concave, or from concave to convex. A number of inflection points is counted from a center of the lens to an outer edge of the optical portion of the lens. For example, at least one inflection point may be formed on either one or both of the object-side surface and the image-side surface of the fourth lens. Therefore, at least one surface of the fourth lens may have a paraxial region and a peripheral region having shapes that are different from each other. For example, a paraxial region of the object-side surface of the fourth lens may be convex, but a peripheral region of the object-side surface of the fourth lens may be concave. The fourth lens may have an aspherical surface. For example, one surface or both surfaces of the fourth lens may be aspherical.

The fifth lens has a refractive power. For example, the fifth lens may have a positive refractive power. One surface of the fifth lens may be concave. For example, an object-side surface of the fifth lens may be concave. One surface of the fifth lens may be convex. For example, an image-side surface of the fifth lens may be convex. The fifth lens may have an aspherical surface. For example, one surface or both surfaces of the fifth lens may be aspherical.

The sixth lens has a refractive power. For example, the sixth lens may have a positive refractive power. One surface or both surfaces of the sixth lens may be convex. For example, an image-side surface of the sixth lens may be convex, or both an object-side surface and the image-side surface of the sixth lens may be convex. One surface of the sixth lens may be concave. For example, the object-side surface of the sixth lens may be concave. The sixth lens may have at least one inflection point. For example, at least one inflection point may be formed on either one or both of the object-side surface and the image-side surface of the sixth lens. Therefore, at least one surface of the sixth lens may have a paraxial region and a peripheral region having shapes that are different from each other. For example, a paraxial region of the object-side surface of the sixth lens may be concave, but a peripheral region of the object-side surface of the sixth lens may be convex. The sixth lens may have an aspherical surface. For example, one surface or both surfaces of the sixth lens may be aspherical.

The seventh lens has a refractive power. For example, the seventh lens may have a positive refractive power or a negative refractive power. One surface of the seventh lens may be concave. For example, an object-side surface of the seventh lens may be concave. One surface of the seventh lens may be convex. For example, an image-side surface of the seventh lens may be convex. The seventh lens may have at least one inflection point. For example, at least one inflection point may be formed on either one or both of the object-side surface and the image-side surface of the seventh lens. Therefore, at least one surface of the seventh lens may have a paraxial region and a peripheral region having shapes that are different from each other. For example, a paraxial region of the object-side surface of the seventh lens may be concave, but a peripheral region thereof may be convex. The seventh lens may have an aspherical surface. For example, one surface or both surfaces of the seventh lens may be aspherical.

The eighth lens has a refractive power. For example, the eighth lens may have a negative refractive power. Both surfaces of the eighth lens may be concave. For example, an object-side surface and an image-side surface of the eighth lens may be concave. The eighth lens may have at least one inflection point. For example, at least one inflection point may be formed on either one or both of the object-side surface and the image-side surface of the eighth lens. Therefore, at least one surface of the eighth lens may have a paraxial region and a peripheral region having shapes that are different from each other. For example, a paraxial region of the object-side surface of the eighth lens may be concave, but a peripheral region of the object-side surface of the eighth lens may be convex. The eighth lens may have an aspherical surface. For example, one surface or both surfaces of the eighth lens may be aspherical.

The lenses of the optical imaging system may be made of a light material having a high light transmittance. For example, the first to eighth lenses may be made of a plastic material. However, a material of the first to eighth lenses is not limited to the plastic material.

The aspherical surfaces of the first to eighth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + \ldots \quad (1)$$

In Equation 1, c is a curvature of a lens surface and is equal to an inverse of a radius of curvature of the lens surface at an optical axis of the lens surface, K is a conic constant, Y is a distance from a certain point on an aspherical surface of the lens to an optical axis of the lens in a direction perpendicular to the optical axis, A to H are aspherical constants, and Z (or sag) is a distance between the certain point on the aspherical surface of the lens at the distance Y to the optical axis and a tangential plane perpendicular to the optical axis meeting the apex of the aspherical surface of the lens. The examples disclosed in this application also include an aspherical constant J. An additional term of $JY^{20}$ may be added to the right side of Equation 1 to reflect the effect of the aspherical constant J.

The optical imaging system may satisfy one or more of the following Conditional Expressions 1 to 24.

| | |
|---|---|
| $0.1 < L1w/L8w < 0.3$ | (Conditional Expression 1) |
| $1.0 < S7d/f < 1.4$ | (Conditional Expression 2) |
| $0.4 < L1TD/L8TD < 0.8$ | (Conditional Expression 3) |

-continued

| | |
|---|---|
| $0.4 < L1234TDavg/L8TD < 0.8$ | (Conditional Expression 4) |
| $0.5 < L12345TDavg/L8TD < 0.8$ | (Conditional Expression 5) |
| $(V2 + V4)/2 < 20$ | (Conditional Expression 6) |
| $50 < (V5 + V6 + V7 + V8)/4$ | (Conditional Expression 7) |
| $1.6 < Nd2 < 1.8$ | (Conditional Expression 8) |
| $1.6 < Nd4 < 1.8$ | (Conditional Expression 9) |
| $Nd6 < 1.6$ | (Conditional Expression 10) |
| $0.8 < f1/f5 < 1.4$ | (Conditional Expression 11) |
| $-4.0 < f3/f2 < -2.0$ | (Conditional Expression 12) |
| $-2.0 < f5/f8 < -1.0$ | (Conditional Expression 13) |
| $0.7 < f5/f < 1.2$ | (Conditional Expression 14) |
| $1.0 < TTL/f1 < 1.4$ | (Conditional Expression 15) |
| $1.0 < TTL/f5 < 1.8$ | (Conditional Expression 16) |
| $0.9 < R7/R8 < 1.2$ | (Conditional Expression 17) |
| $0.8 < R13/R14 < 1.2$ | (Conditional Expression 18) |
| $0.8 < R16/R1 < 1.2$ | (Conditional Expression 19) |
| $3.4 < (R2 - R15)/(R1 + R16) < 5.0$ | (Conditional Expression 20) |
| $LT4 < LT3$ or $LT4 < LT5$ | (Conditional Expression 21) |
| $2.0 < |R15/R16| < 5.0$ | (Conditional Expression 22) |
| $3.0 < (R7*R9)/(R8*R10) < 5.0$ | (Conditional Expression 23) |
| $0.2 < (R7*R10)/(R8*R9) < 0.4$ | (Conditional Expression 24) |

In the above Conditional Expressions, L1w is a weight of the first lens, and L8w is a weight of the eighth lens.

S7d is an inner diameter of the seventh spacer, and f is an overall focal length of the optical imaging system.

L1TD is an overall outer diameter of the first lens, and L8TD is an overall outer diameter of the eighth lens. The overall outer diameter of a lens is a diameter of the lens including both the optical portion of the lens and the rib of the lens.

L1234TDavg is an average value of overall outer diameters of the first to fourth lenses, and L12345TDavg is an average value of overall outer diameters of the first to fifth lenses.

V2 is an Abbe number of the second lens, V4 is an Abbe number of the fourth lens, V5 is an Abbe number of the fifth lens, V6 is an Abbe number of the sixth lens, V7 is an Abbe number of the seventh lens, and V8 is an Abbe number of the eighth lens.

Nd2 is an index of refraction of the second lens, Nd4 is an index of refraction of the fourth lens, and Nd6 is an index of refraction of the sixth lens.

f1 is a focal length of the first lens, f2 is a focal length of the second lens, f3 is a focal length of the third lens, f5 is a focal length of the fifth lens, f8 is a focal length of the eighth lens, and TTL is a distance along an optical axis of the optical imaging system from an object-side surface of the first lens to an imaging plane of the optical imaging system.

R1 is a radius of curvature of the object-side surface of the first lens, R2 is a radius of curvature of an image-side surface of the first lens, R7 is a radius of curvature of an object-side surface of the fourth lens, R8 is a radius of curvature of an image-side surface of the fourth lens, R9 is a radius of curvature of an object-side surface of the fifth lens, R10 is a radius of curvature of an image-side surface of the fifth lens, R13 is a radius of curvature of an object-side surface of the seventh lens, R14 is a radius of curvature of an image-side surface of the seventh lens, R15 is a radius of curvature of an object-side surface of the eighth lens, and R16 is a radius of curvature of an image-side surface of the eighth lens.

LT3 is a thickness along the optical axis of the third lens, LT4 is a thickness along the optical axis of the fourth lens, and LT5 is a thickness along the optical axis of the fifth lens.

Conditional Expressions 1 and 3 specify ranges of a weight ratio and an overall outer diameter ratio between the first lens and the eighth lens to facilitate a self-alignment between the lenses and an alignment of the lenses with the lens barrel.

Conditional Expression 2 specifies a range of a ratio of the inner diameter of the seventh spacer to the overall focal length of the optical imaging system to minimize a flare phenomenon.

Conditional Expressions 4 and 5 specify overall outer diameter ratios between the lenses to facilitate aberration correction.

The optical imaging system may also satisfy Conditional Expression 10 while satisfying Conditional Expression 8 or 9.

Next, various examples of the optical imaging system will be described. In the tables that appear in the following examples, S1 denotes an object-side surface of a first lens, S2 denotes an image-side surface of the first lens, S3 denotes an object-side surface of a second lens, S4 denotes an image-side surface of the second lens, S5 denotes an object-side surface of a third lens, S6 denotes an image-side surface of the third lens, S7 denotes an object-side surface of a fourth lens, S8 denotes an image-side surface of the fourth lens, S9 denotes an object-side surface of a fifth lens, S10 denotes an image-side surface of the fifth lens, S11 denotes an object-side surface of a sixth lens, S12 denotes an image-side surface of the sixth lens, S13 denotes an object-side surface of a seventh lens, S14 denotes an image-side surface of the seventh lens, S15 denotes an object-side surface of an eighth lens, S16 denotes an image-side surface of the eighth lens, S17 denotes an object-side surface of a filter, S18 represents an image-side surface of the filter, and S19 denotes an imaging plane.

Example 1

Figure 2:
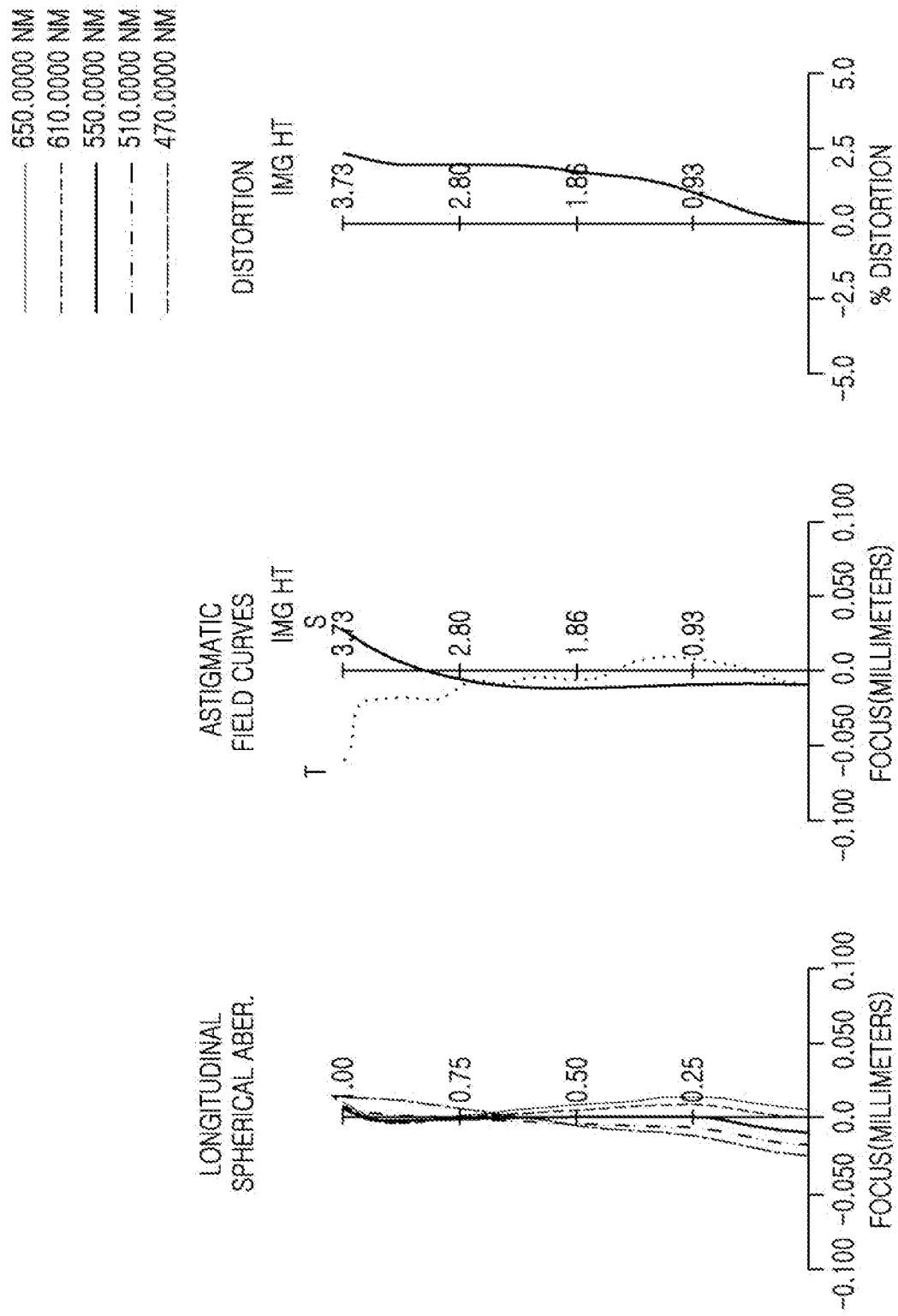
FIG. 2 illustrates aberration curves of the optical imaging system of FIG. 1.

FIG. 1 is a view illustrating a first example of an optical imaging system, and FIG. 2 illustrates aberration curves of the optical imaging system of FIG. 1.

An optical imaging system 101 includes a first lens 1001, a second lens 2001, a third lens 3001, a fourth lens 4001, a fifth lens 5001, a sixth lens 6001, a seventh lens 7001, and an eighth lens 8001.

The first lens 1001 has a positive refractive power, a convex object-side surface, and a concave image-side surface. The second lens 2001 has a negative refractive power, a convex object-side surface, and a concave image-side surface. The third lens 3001 has a positive refractive power, a convex object-side surface, and a concave image-side surface. The fourth lens 4001 has a positive refractive power, a convex object-side surface, and a concave image-side surface. In addition, at least one inflection point is formed on either one or both of the object-side surface and the image-side surface of the fourth lens 4001. The fifth lens 5001 has a positive refractive power, a concave object-side surface, and a convex image-side surface. The sixth lens 6001 has a positive refractive power, a concave object-side surface, and a convex image-side surface. In addition, at least one inflection point is formed on either one or both of the object-side surface and the image-side surface of the sixth lens 6001. The seventh lens 7001 has a negative refractive power, a concave object-side surface, and a convex image-side surface. In addition, at least one inflection point is formed on either one or both of the object-side surface and the image-side surface of the seventh lens 7001. The eighth lens 8001 has a negative refractive power, a concave object-side surface, and a concave image-side surface. In addition, at least one inflection point is formed on either one or both of the object-side surface and the image-side surface of the eighth lens 8001.

The optical imaging system 101 further includes a stop, a filter 9001, and an image sensor 9101. The stop is disposed between the first lens 1001 and the second lens 2001 to adjust an amount of light incident on the image sensor 9101. The filter 9001 is disposed between the eighth lens 8001 and the image sensor 9101 to block infrared rays. The image sensor 9101 forms an imaging plane on which an image of a subject is formed. Although not illustrated in FIG. 1, the stop is disposed at a distance of 0.860 mm from the object-side surface of the first lens 1001 toward the imaging plane of the optical imaging system 101. This distance is equal to TTL-SL and can be calculated from the values of TTL and SL for Example 1 listed in Table 21 that appears later in this application.

Table 1 below shows physical properties of the lenses and other elements of the optical imaging system of FIG. 1, and Table 2 below shows aspherical surface coefficients of the lenses of FIG. 1. Both surfaces of all of the lenses of FIG. 1 are aspherical.

TABLE 1

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.795 | 0.706 | 1.546 | 56.110 | 1.150 | 4.215 |
| S2 | Lens | 7.026 | 0.154 | | | 1.189 | |
| S3 (Stop) | Second | 14.528 | 0.230 | 1.677 | 19.240 | 1.098 | −10.176 |
| S4 | Lens | 4.643 | 0.237 | | | 1.088 | |
| S5 | Third | 6.269 | 0.415 | 1.546 | 56.110 | 1.150 | 29.645 |
| S6 | Lens | 9.993 | 0.162 | | | 1.230 | |
| S7 | Fourth | 5.018 | 0.260 | 1.677 | 19.270 | 1.241 | 192.851 |
| S8 | Lens | 5.109 | 0.337 | | | 1.400 | |
| S9 | Fifth | −7.227 | 0.774 | 1.546 | 56.110 | 1.553 | 3.554 |
| S10 | Lens | −1.587 | 0.025 | | | 1.930 | |
| S11 | Sixth | −12.159 | 0.250 | 1.546 | 56.110 | 2.106 | 111.853 |
| S12 | Lens | −10.214 | 0.027 | | | 2.510 | |
| S13 | Seventh | −8.129 | 0.400 | 1.546 | 56.110 | 2.615 | −150.465 |
| S14 | Lens | −9.179 | 0.233 | | | 2.725 | |
| S15 | Eighth | −6.692 | 0.230 | 1.546 | 56.110 | 2.850 | −2.717 |
| S16 | Lens | 1.929 | 0.171 | | | 3.139 | |
| S17 | Filter | Infinity | 0.210 | 1.518 | 64.170 | 3.354 | |
| S18 | | Infinity | 0.640 | | | 3.414 | |
| S19 | Imaging Plane | Infinity | 0.010 | | | 3.736 | |

TABLE 2

| | K | A | B | C | D | E | F | G | H | J |
|---|---|---|---|---|---|---|---|---|---|---|
| S1 | −1.0480 | 0.0221 | 0.0111 | −0.0338 | 0.0934 | −0.1598 | 0.1654 | −0.1021 | 0.0340 | −0.0048 |
| S2 | −0.8852 | −0.0418 | 0.0586 | −0.2214 | 0.5998 | −1.0430 | 1.1258 | −0.7342 | 0.2649 | −0.0406 |
| S3 | −3.9564 | −0.0963 | 0.1879 | −0.5654 | 1.6233 | −3.0298 | 3.5408 | −2.5024 | 0.9796 | −0.1630 |
| S4 | −4.8667 | −0.0683 | 0.1256 | −0.2315 | 0.5981 | −1.1574 | 1.4929 | −1.1835 | 0.5215 | −0.0960 |
| S5 | −6.0535 | −0.0537 | 0.0641 | −0.3843 | 1.0760 | −2.0031 | 2.3634 | −1.6902 | 0.6673 | −0.1104 |
| S6 | −1.0507 | −0.1016 | 0.0933 | −0.2230 | 0.3347 | −0.4324 | 0.3856 | −0.2085 | 0.0649 | −0.0098 |
| S7 | 4.6044 | −0.2324 | 0.1982 | −0.6013 | 1.3820 | −2.0781 | 1.9419 | −1.0915 | 0.3428 | −0.0471 |
| S8 | −8.7421 | −0.1572 | 0.0982 | −0.2661 | 0.5435 | −0.6878 | 0.5413 | −0.2572 | 0.0673 | −0.0074 |
| S9 | −27.3339 | −0.0147 | 0.0237 | −0.0936 | 0.1181 | −0.0890 | 0.0466 | −0.0175 | 0.0040 | −0.0004 |
| S10 | −1.3994 | 0.1191 | −0.1718 | 0.1368 | −0.0764 | 0.0328 | −0.0096 | 0.0017 | −0.0002 | 0.0000 |
| S11 | −2.3975 | 0.0534 | −0.1241 | 0.0939 | −0.0632 | 0.0302 | −0.0086 | 0.0014 | −0.0001 | 0.0000 |
| S12 | −0.2466 | −0.0316 | 0.0469 | −0.0312 | 0.0109 | −0.0022 | 0.0002 | 0.0000 | 0.0000 | 0.0000 |
| S13 | −13.5145 | 0.0262 | −0.0386 | 0.0262 | −0.0103 | 0.0024 | −0.0003 | 0.0000 | 0.0000 | 0.0000 |
| S14 | −50.6951 | 0.1183 | −0.1302 | 0.0693 | −0.0200 | 0.0028 | −0.0001 | 0.0000 | 0.0000 | 0.0000 |
| S15 | −98.5085 | −0.0783 | −0.0178 | 0.0631 | −0.0361 | 0.0102 | −0.0017 | 0.0002 | 0.0000 | 0.0000 |
| S16 | −1.1776 | −0.2027 | 0.1040 | −0.0371 | 0.0092 | −0.0016 | 0.0002 | 0.0000 | 0.0000 | 0.0000 |

Example 2

Figure 3:
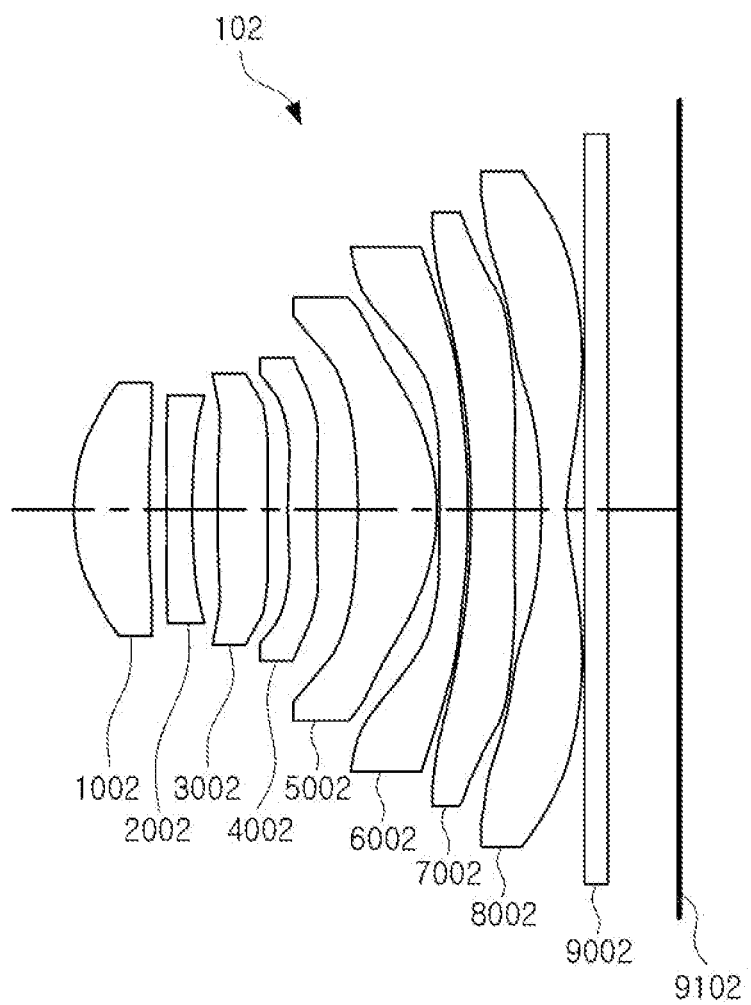
FIG. 3 is a view illustrating a second example of an optical imaging system.
Figure 4:
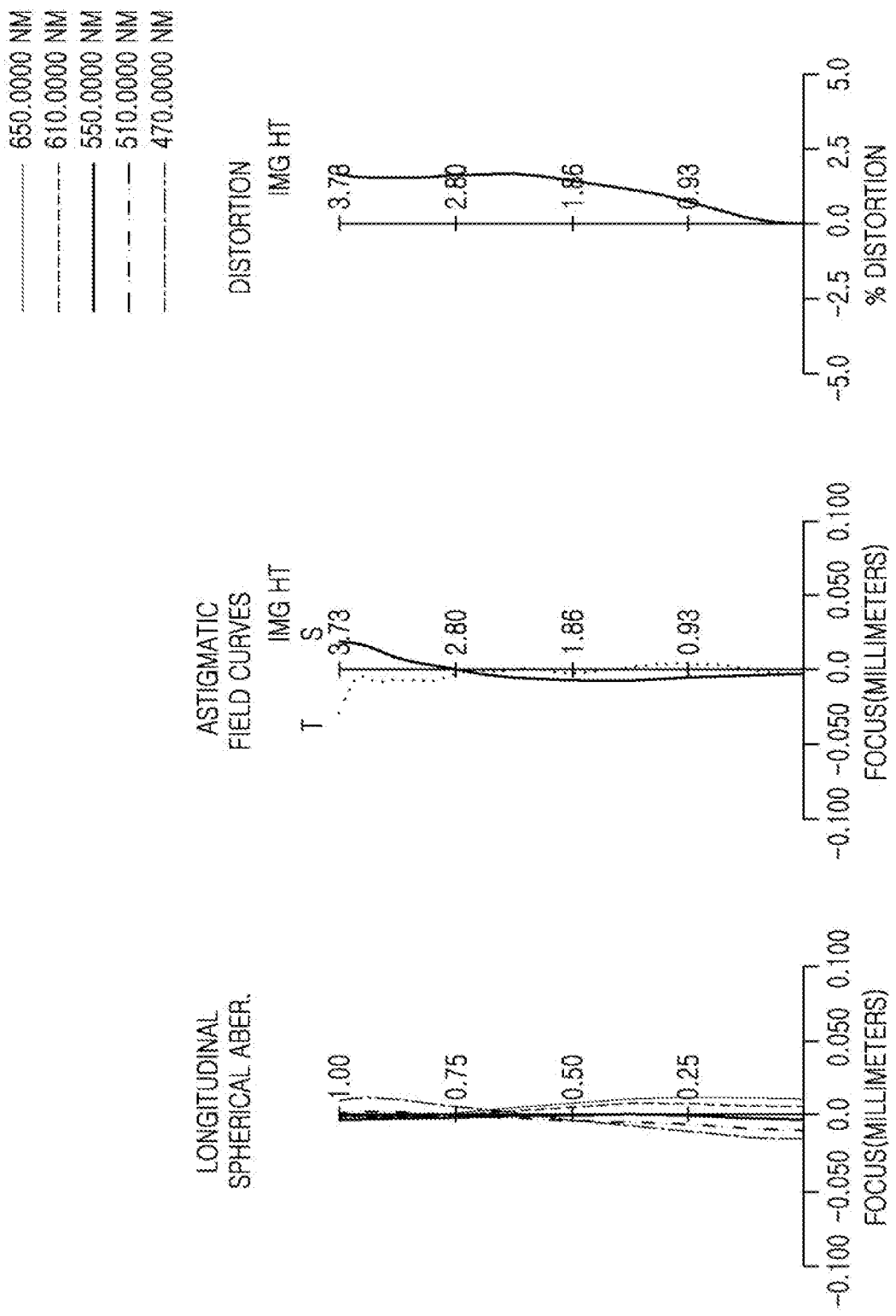
FIG. 4 illustrates aberration curves of the optical imaging system of FIG. 3.

FIG. 3 is a view illustrating a second example of an optical imaging system of FIG. 4, and FIG. 4 illustrates aberration curves of the optical imaging system of FIG. 3.

An optical imaging system 102 includes a first lens 1002, a second lens 2002, a third lens 3002, a fourth lens 4002, a fifth lens 5002, a sixth lens 6002, a seventh lens 7002, and an eighth lens 8002.

The first lens 1002 has a positive refractive power, a convex object-side surface, and a concave image-side surface. The second lens 2002 has a negative refractive power, a convex object-side surface, and a concave image-side surface. The third lens 3002 has a positive refractive power, a convex object-side surface, and a concave image-side surface. The fourth lens 4002 has a positive refractive power, a convex object-side surface, and a concave image-side surface. In addition, at least one inflection point is formed on either one or both of the object-side surface and the image-side surface of the fourth lens 4002. The fifth lens 5002 has a positive refractive power, a concave object-side surface, and a convex image-side surface. The sixth lens 6002 has a positive refractive power, a concave object-side surface, and a convex image-side surface. In addition, at least one inflection point is formed on either one or both of the object-side surface and the image-side surface of the sixth lens 6002. The seventh lens 7002 has a negative refractive power, a concave object-side surface, and a convex image-side surface. In addition, at least one inflection point is formed on either one or both of the object-side surface and the image-side surface of the seventh lens 7002. The eighth lens 8002 has a negative refractive power, a concave object-side surface, and a concave image-side surface. In addition, at least one inflection point is formed on either one or both of the object-side surface and the image-side surface of the eighth lens 8002.

The optical imaging system 102 further includes a stop, a filter 9002, and an image sensor 9102. The stop is disposed between the first lens 1002 and the second lens 2002 to adjust an amount of light incident on the image sensor 9102. The filter 9002 is disposed between the eighth lens 8002 and the image sensor 9102 to block infrared rays. The image sensor 9102 forms an imaging plane on which an image of a subject is formed. Although not illustrated in FIG. 3, the stop is disposed at a distance of 0.844 mm from the object-side surface of the first lens 1002 toward the imaging plane of the optical imaging system 102. This distance is equal to TTL-SL and can be calculated from the values of TTL and SL for Example 2 listed in Table 21 that appears later in this application.

Table 3 below shows physical properties of the lenses of the optical imaging system of FIG. 3, and Table 4 below shows aspherical surface coefficients of the lenses of FIG. 3. Both surfaces of all of the lenses of FIG. 3 are aspherical.

TABLE 3

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.783 | 0.680 | 1.546 | 56.110 | 1.150 | 4.081 |
| S2 | Lens | 7.721 | 0.165 | | | 1.077 | |
| S3 (Stop) | Second | 17.012 | 0.230 | 1.677 | 19.240 | 1.020 | −9.162 |
| S4 | Lens | 4.520 | 0.231 | | | 1.037 | |
| S5 | Third | 6.723 | 0.458 | 1.546 | 56.110 | 1.150 | 23.634 |
| S6 | Lens | 13.699 | 0.186 | | | 1.230 | |
| S7 | Fourth | 5.770 | 0.260 | 1.677 | 19.270 | 1.224 | 152.337 |
| S8 | Lens | 6.001 | 0.372 | | | 1.382 | |
| S9 | Fifth | −6.234 | 0.724 | 1.546 | 56.110 | 1.545 | 3.736 |
| S10 | Lens | −1.600 | 0.025 | | | 1.930 | |
| S11 | Sixth | −9.639 | 0.251 | 1.546 | 56.110 | 1.981 | 80.744 |
| S12 | Lens | −7.983 | 0.025 | | | 2.400 | |
| S13 | Seventh | −7.023 | 0.400 | 1.546 | 56.110 | 2.529 | −80.158 |
| S14 | Lens | −8.534 | 0.242 | | | 2.705 | |
| S15 | Eighth | −5.433 | 0.230 | 1.546 | 56.110 | 2.850 | −2.642 |
| S16 | Lens | 1.993 | 0.162 | | | 3.078 | |
| S17 | Filter | Infinity | 0.210 | 1.518 | 64.170 | 3.352 | |
| S18 | | Infinity | 0.647 | | | 3.414 | |
| S19 | Imaging Plane | Infinity | 0.003 | | | 3.731 | |

TABLE 4

| | K | A | B | C | D | E | F | G | H | J |
|---|---|---|---|---|---|---|---|---|---|---|
| S1 | −1.0436 | 0.0239 | 0.0020 | 0.0102 | −0.0326 | 0.0617 | −0.0739 | 0.0524 | −0.0207 | 0.0033 |
| S2 | 0.9904 | −0.0368 | 0.0259 | −0.0617 | 0.1386 | −0.2340 | 0.2546 | −0.1718 | 0.0657 | −0.0109 |
| S3 | −3.9564 | −0.0884 | 0.1088 | −0.1533 | 0.3592 | −0.6753 | 0.8522 | −0.6651 | 0.2926 | −0.0554 |
| S4 | −5.6918 | −0.0649 | 0.1105 | −0.2011 | 0.5767 | −1.2513 | 1.7800 | −1.5333 | 0.7280 | −0.1442 |
| S5 | −9.7917 | −0.0484 | 0.0292 | −0.2324 | 0.6382 | −1.2284 | 1.5190 | −1.1476 | 0.4820 | −0.0847 |
| S6 | −1.0507 | −0.0971 | 0.0812 | −0.1864 | 0.2461 | −0.2826 | 0.2398 | −0.1362 | 0.0497 | −0.0092 |
| S7 | 5.2465 | −0.2251 | 0.1448 | −0.3845 | 0.8809 | −1.3778 | 1.3741 | −0.8457 | 0.2961 | −0.0454 |
| S8 | −11.2424 | −0.1619 | 0.0779 | −0.1744 | 0.3448 | −0.4298 | 0.3405 | −0.1661 | 0.0452 | −0.0051 |
| S9 | −27.3339 | −0.0243 | 0.0350 | −0.1065 | 0.1227 | −0.0870 | 0.0458 | −0.0182 | 0.0044 | −0.0004 |
| S10 | −1.3998 | 0.1111 | −0.1364 | 0.0906 | −0.0469 | 0.0225 | −0.0076 | 0.0015 | −0.0001 | 0.0000 |
| S11 | −2.3975 | 0.0488 | −0.1065 | 0.0613 | −0.0334 | 0.0155 | −0.0045 | 0.0007 | −0.0001 | 0.0000 |
| S12 | −0.0025 | −0.0192 | 0.0252 | −0.0149 | 0.0045 | −0.0007 | 0.0001 | 0.0000 | 0.0000 | 0.0000 |
| S13 | −8.2078 | 0.0328 | −0.0493 | 0.0331 | −0.0128 | 0.0030 | −0.0004 | 0.0000 | 0.0000 | 0.0000 |
| S14 | −46.5557 | 0.1260 | −0.1472 | 0.0837 | −0.0270 | 0.0050 | −0.0005 | 0.0000 | 0.0000 | 0.0000 |

TABLE 4-continued

|  | K | A | B | C | D | E | F | G | H | J |
|---|---|---|---|---|---|---|---|---|---|---|
| S15 | −98.5085 | −0.0818 | −0.0107 | 0.0547 | −0.0314 | 0.0088 | −0.0014 | 0.0001 | 0.0000 | 0.0000 |
| S16 | −1.2302 | −0.1994 | 0.1026 | −0.0363 | 0.0088 | −0.0015 | 0.0002 | 0.0000 | 0.0000 | 0.0000 |

Example 3

Figure 5:
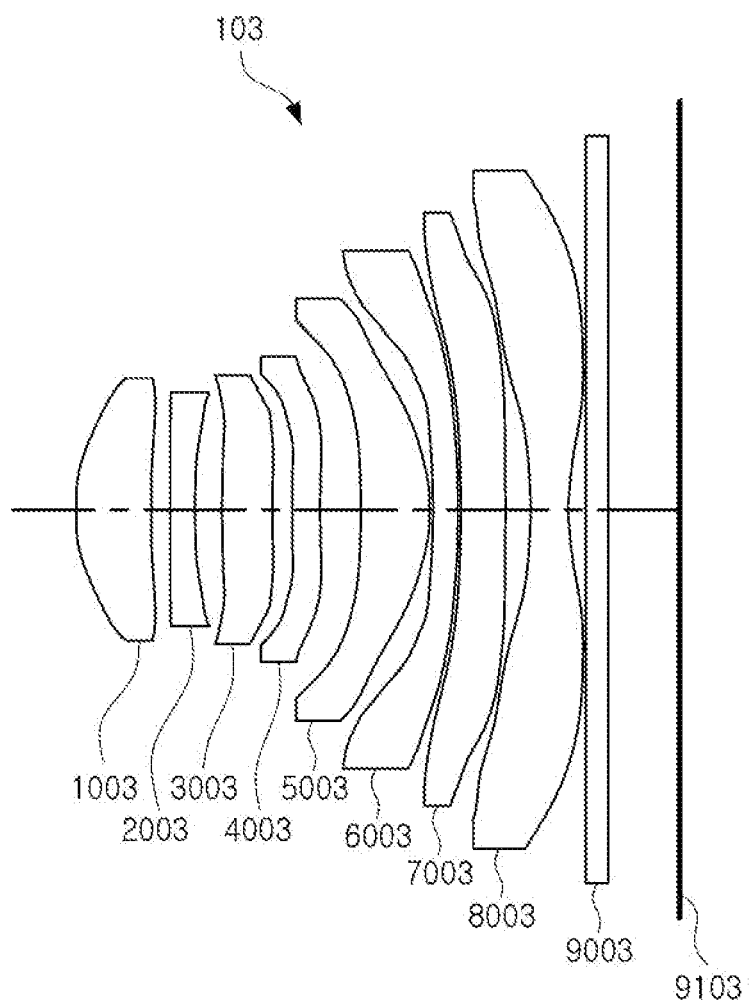
FIG. 5 is a view illustrating a third example of an optical imaging system.
Figure 6:
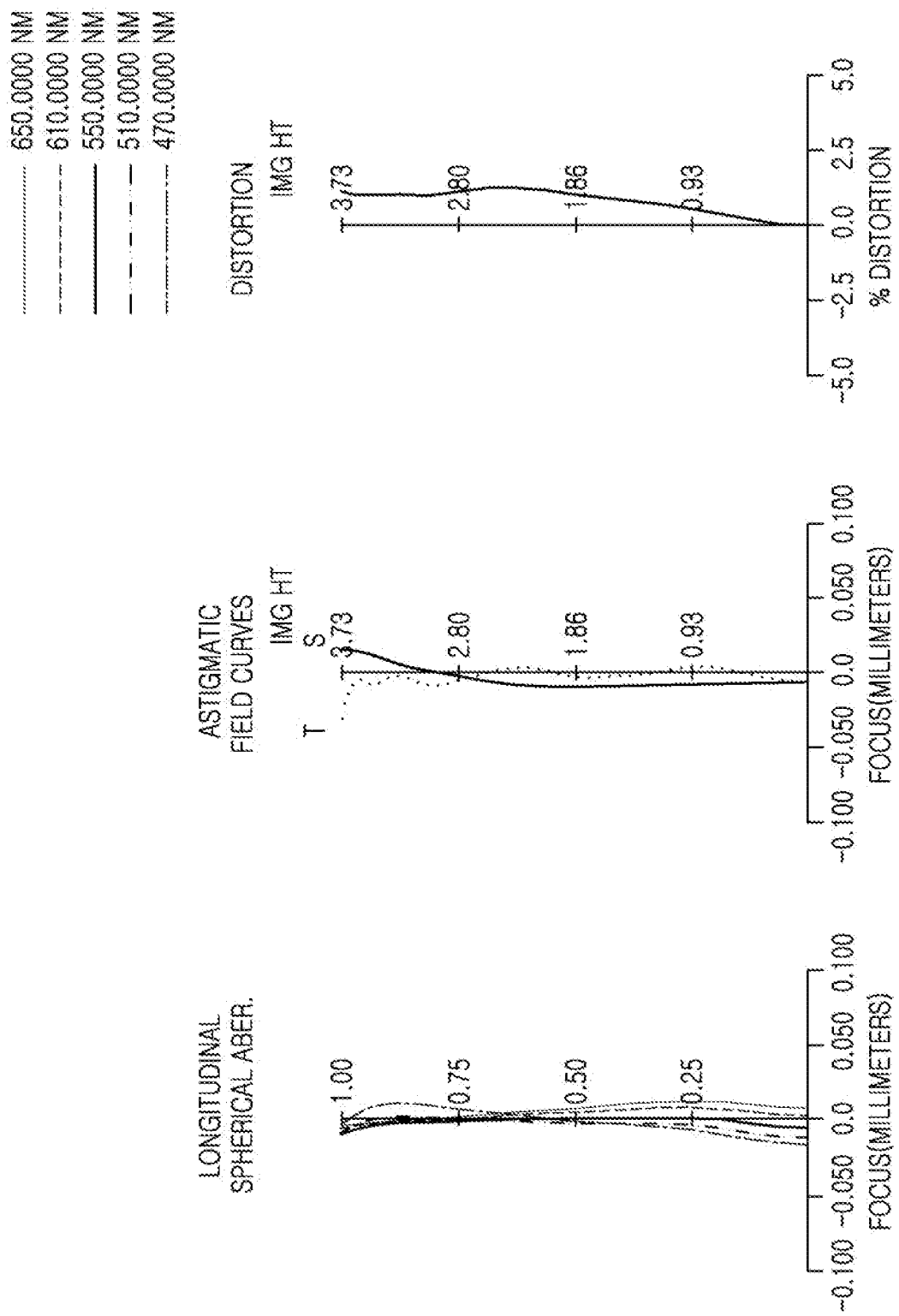
FIG. 6 illustrates aberration curves of the optical imaging system of FIG. 5.

FIG. 5 is a view illustrating a third example of an optical imaging system, and FIG. 6 illustrates aberration curves of the optical imaging system of FIG. 5.

An optical imaging system 103 includes a first lens 1003, a second lens 2003, a third lens 3003, a fourth lens 4003, a fifth lens 5003, a sixth lens 6003, a seventh lens 7003, and an eighth lens 8003.

The first lens 1003 has a positive refractive power, a convex object-side surface, and a concave image-side surface. The second lens 2003 has a negative refractive power, a convex object-side surface, and a concave image-side surface. The third lens 3003 has a positive refractive power, a convex object-side surface, and a concave image-side surface. The fourth lens 4003 has a positive refractive power, a convex object-side surface, and a concave image-side surface. In addition, at least one inflection point is formed on either one or both of the object-side surface and the image-side surface of the fourth lens 4003. The fifth lens 5003 has a positive refractive power, a concave object-side surface, and a convex image-side surface. The sixth lens 6003 has a positive refractive power, a concave object-side surface, and a convex image-side surface. In addition, at least one inflection point is formed on either one or both of the object-side surface and the image-side surface of the sixth lens 6003. The seventh lens 7003 has a negative refractive power, a concave object-side surface, and a convex image-side surface. In addition, at least one inflection point is formed on either one or both of the object-side surface and the image-side surface of the seventh lens 7003. The eighth lens 8003 has a negative refractive power, a concave object-side surface, and a concave image-side surface. In addition, at least one inflection point is formed on either one or both of the object-side surface and the image-side surface of the eighth lens 8003.

The optical imaging system further includes a stop, a filter 9003, and an image sensor 9103. The stop is disposed between the first lens 1003 and the second lens 2003 to adjust an amount of light incident on the image sensor 9103. The filter 9003 is disposed between the eighth lens 8003 and the image sensor 9103 to block infrared rays. The image sensor 9103 forms an imaging plane on which an image of a subject is formed. Although not illustrated in FIG. 5, the stop is disposed at a distance of 0.855 mm from the object-side surface of the first lens 1003 toward the imaging plane of the optical imaging system 103. This distance is equal to TTL-SL and can be calculated from the values of TTL and SL for Example 3 listed in Table 21 that appears later in this application.

Table 5 below shows physical properties of the lenses and other elements of the optical imaging system of FIG. 5, and Table 6 below shows aspherical surface coefficients of the lenses of FIG. 5. Both surfaces of all of the lenses of FIG. 5 are aspherical.

TABLE 5

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.783 | 0.679 | 1.546 | 56.110 | 1.200 | 4.023 |
| S2 | Lens | 8.209 | 0.176 |  |  | 1.139 |  |
| S3 (Stop) | Second | 18.872 | 0.230 | 1.677 | 19.240 | 1.071 | −9.031 |
| S4 | Lens | 4.595 | 0.240 |  |  | 1.072 |  |
| S5 | Third | 7.227 | 0.464 | 1.546 | 56.110 | 1.150 | 24.326 |
| S6 | Lens | 15.494 | 0.177 |  |  | 1.230 |  |
| S7 | Fourth | 6.258 | 0.256 | 1.677 | 19.270 | 1.241 | 3233.009 |
| S8 | Lens | 6.172 | 0.373 |  |  | 1.394 |  |
| S9 | Fifth | −6.342 | 0.627 | 1.546 | 56.110 | 1.561 | 3.815 |
| S10 | Lens | −1.623 | 0.025 |  |  | 1.930 |  |
| S11 | Sixth | −9.060 | 0.230 | 1.546 | 56.110 | 1.962 | 895.716 |
| S12 | Lens | −8.975 | 0.029 |  |  | 2.372 |  |
| S13 | Seventh | −7.785 | 0.403 | 1.546 | 56.110 | 2.555 | −281.821 |
| S14 | Lens | −8.349 | 0.230 |  |  | 2.707 |  |
| S15 | Eighth | −5.308 | 0.345 | 1.546 | 56.110 | 2.850 | −2.706 |
| S16 | Lens | 2.094 | 0.156 |  |  | 3.106 |  |
| S17 | Filter | Infinity | 0.210 | 1.518 | 64.170 | 3.353 |  |
| S18 |  | Infinity | 0.644 |  |  | 3.411 |  |
| S19 | Imaging Plane | Infinity | 0.006 |  |  | 3.732 |  |

TABLE 6

|  | K | A | B | C | D | E | F | G | H | J |
|---|---|---|---|---|---|---|---|---|---|---|
| S1 | −1.0527 | 0.0240 | 0.0004 | 0.0176 | −0.0511 | 0.0859 | −0.0894 | 0.0551 | −0.0189 | 0.0026 |
| S2 | 2.4640 | −0.0334 | 0.0079 | 0.0169 | −0.0671 | 0.1040 | −0.0913 | 0.0406 | −0.0059 | −0.0007 |
| S3 | −3.9564 | −0.0891 | 0.1171 | −0.2214 | 0.6356 | −1.2698 | 1.5950 | −1.2099 | 0.5092 | −0.0912 |
| S4 | −6.3176 | −0.0640 | 0.0917 | −0.1186 | 0.3378 | −0.7503 | 1.0771 | −0.9245 | 0.4342 | −0.0839 |

TABLE 6-continued

| | K | A | B | C | D | E | F | G | H | J |
|---|---|---|---|---|---|---|---|---|---|---|
| S5 | −10.0227 | −0.0453 | 0.0198 | −0.2525 | 0.7692 | −1.5366 | 1.9349 | −1.4773 | 0.6224 | −0.1093 |
| S6 | −1.0507 | −0.0876 | 0.0818 | −0.2623 | 0.4925 | −0.7349 | 0.7568 | −0.4905 | 0.1808 | −0.0292 |
| S7 | 6.3198 | −0.2310 | 0.2084 | −0.6437 | 1.5296 | −2.4420 | 2.4915 | −1.5513 | 0.5369 | −0.0793 |
| S8 | −14.3136 | −0.1739 | 0.1175 | −0.2725 | 0.5102 | −0.6283 | 0.5049 | −0.2517 | 0.0697 | −0.0080 |
| S9 | −27.3339 | −0.0356 | 0.0524 | −0.1270 | 0.1336 | −0.0873 | 0.0443 | −0.0181 | 0.0046 | −0.0005 |
| S10 | −1.3790 | 0.1147 | −0.1666 | 0.1285 | −0.0702 | 0.0321 | −0.0105 | 0.0020 | −0.0002 | 0.0000 |
| S11 | −2.3975 | 0.0725 | −0.1599 | 0.1134 | −0.0594 | 0.0225 | −0.0055 | 0.0008 | −0.0001 | 0.0000 |
| S12 | 4.6394 | −0.0117 | 0.0176 | −0.0117 | 0.0036 | −0.0006 | 0.0001 | 0.0000 | 0.0000 | 0.0000 |
| S13 | −6.6295 | 0.0448 | −0.0659 | 0.0421 | −0.0154 | 0.0034 | −0.0004 | 0.0000 | 0.0000 | 0.0000 |
| S14 | −36.8215 | 0.1343 | −0.1734 | 0.1078 | −0.0384 | 0.0082 | −0.0011 | 0.0001 | 0.0000 | 0.0000 |
| S15 | −98.5085 | −0.0970 | 0.0023 | 0.0513 | −0.0318 | 0.0092 | −0.0015 | 0.0001 | 0.0000 | 0.0000 |
| S16 | −1.2345 | −0.1896 | 0.0978 | −0.0346 | 0.0084 | −0.0014 | 0.0002 | 0.0000 | 0.0000 | 0.0000 |

Example 4

Figure 7:
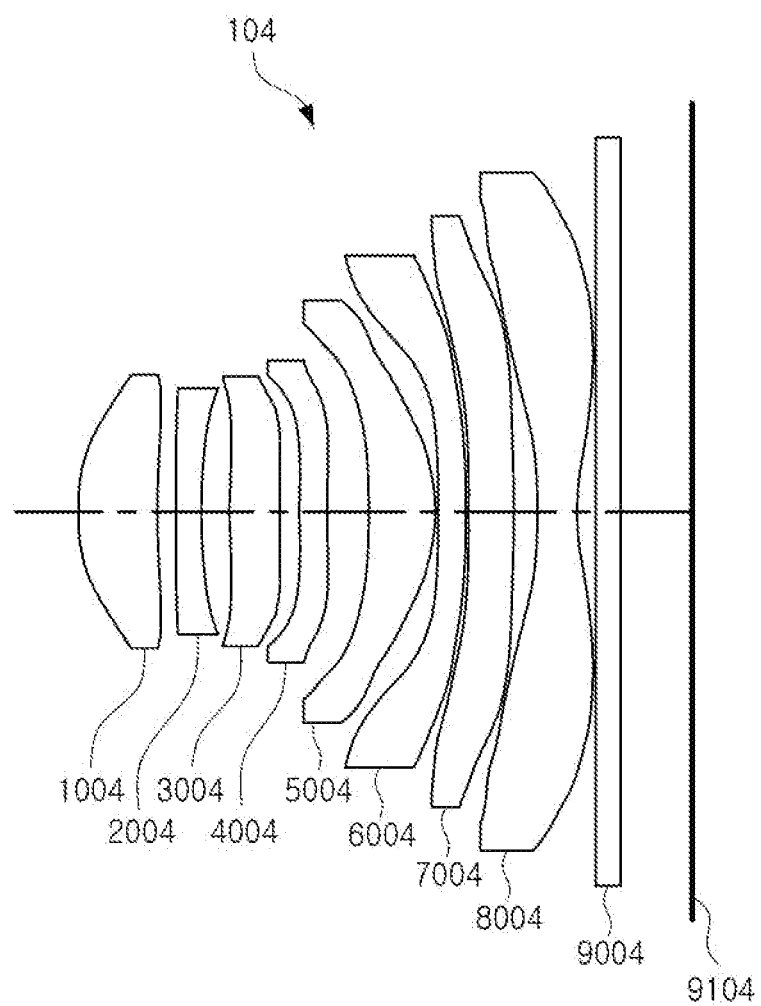
FIG. 7 is a view illustrating a fourth example of an optical imaging system.
Figure 8:
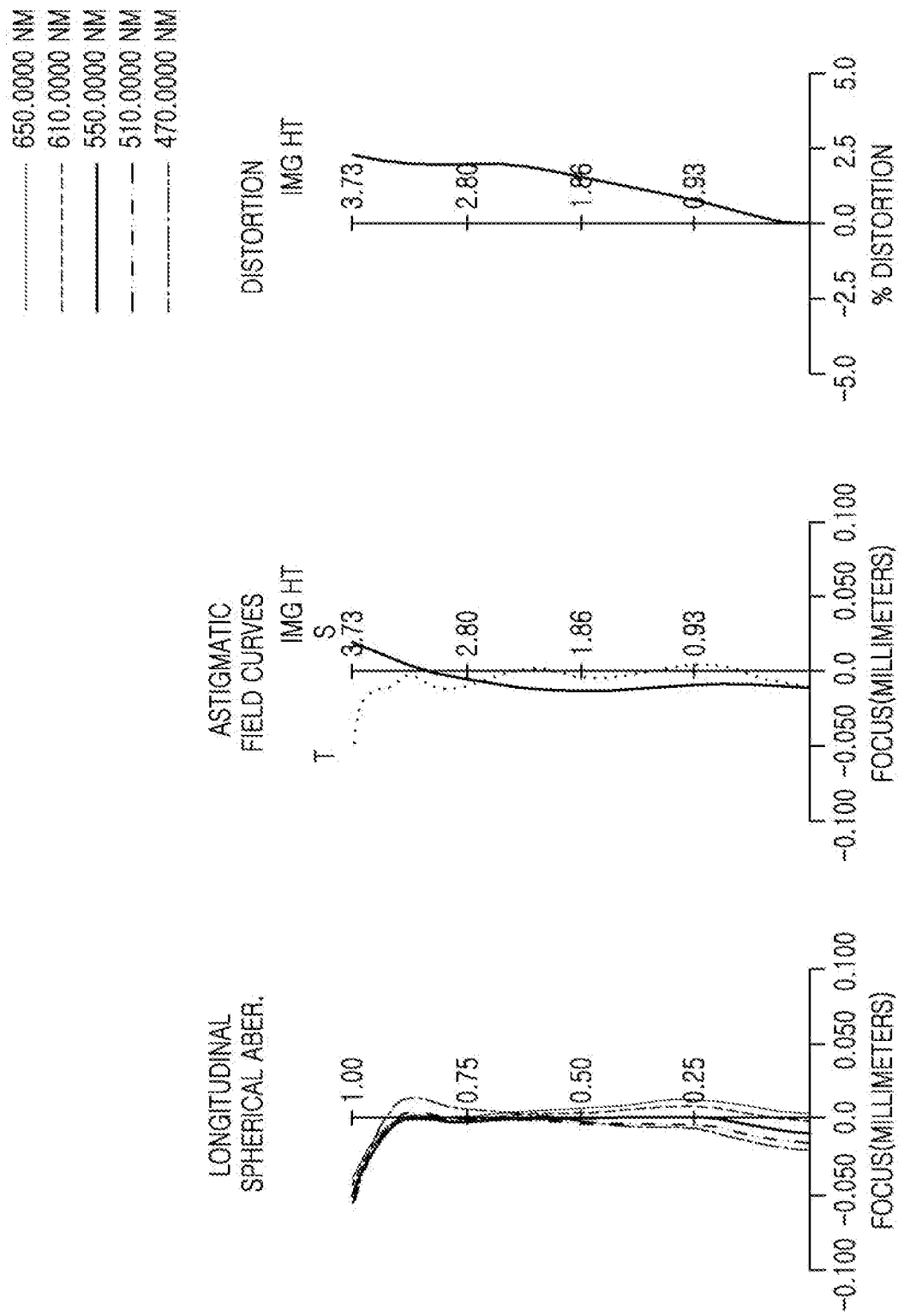
FIG. 8 illustrates aberration curves of the optical imaging system of FIG. 7.

FIG. 7 is a view illustrating a fourth example of an optical imaging system, and FIG. 8 illustrates aberration curves of the optical imaging system of FIG. 7.

An optical imaging system 104 includes a first lens 1004, a second lens 2004, a third lens 3004, a fourth lens 4004, a fifth lens 5004, a sixth lens 6004, a seventh lens 7004, and an eighth lens 8004.

The first lens 1004 has a positive refractive power, a convex object-side surface, and a concave image-side surface. The second lens 2004 has a negative refractive power, a convex object-side surface, and a concave image-side surface. The third lens 3004 has a positive refractive power, a convex object-side surface, and a concave image-side surface. The fourth lens 4004 has a negative refractive power, a convex object-side surface, and a concave image-side surface. In addition, at least one inflection point is formed on either one or both of the object-side surface and the image-side surface of the fourth lens 4004. The fifth lens 5004 has a positive refractive power, a concave object-side surface, and a convex image-side surface. The sixth lens 6004 has a positive refractive power, a concave object-side surface, and a convex image-side surface. In addition, at least one inflection point is formed on either one or both the object-side surface and the image-side surface of the sixth lens 6004. The seventh lens 7004 has a positive refractive power, a concave object-side surface, and a convex image-side surface. In addition, at least one inflection point is formed on either one or both of the object-side surface and the image-side surface of the seventh lens 7004. The eighth lens 8004 has a negative refractive power, a concave object-side surface, and a concave image-side surface. In addition, at least one inflection point is formed on either one or both of the object-side surface and the image-side surface of the eighth lens 8004.

The optical imaging system 104 further includes a stop, a filter 9004, and an image sensor 9104. The stop is disposed between the first lens 1004 and the second lens 2004 to adjust an amount of light incident on the image sensor 9104. The filter 9004 is disposed between the eighth lens 8004 and the image sensor 9104 to block infrared rays. The image sensor 9104 forms an imaging plane on which an image of a subject is formed. Although not illustrated in FIG. 7, the stop is disposed at a distance of 0.872 mm from the object-side surface of the first lens 1004 toward the imaging plane of the optical imaging system 104. This distance is equal to TTL-SL and can be calculated from the values of TTL and SL for Example 4 listed in Table 21 that appears later in this application.

Table 7 below shows properties of the lenses and other elements of the optical imaging system of FIG. 7, and Table 8 below shows aspherical surface coefficients of the lenses of FIG. 7. Both surfaces of all of the lenses of FIG. 7 are aspherical.

TABLE 7

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.791 | 0.707 | 1.546 | 56.110 | 1.250 | 4.017 |
| S2 | Lens | 8.405 | 0.164 | | | 1.198 | |
| S3 (Stop) | Second | 18.861 | 0.230 | 1.677 | 19.240 | 1.122 | −9.189 |
| S4 | Lens | 4.655 | 0.248 | | | 1.098 | |
| S5 | Third | 7.026 | 0.449 | 1.546 | 56.110 | 1.150 | 26.665 |
| S6 | Lens | 13.274 | 0.167 | | | 1.230 | |
| S7 | Fourth | 6.094 | 0.254 | 1.677 | 19.270 | 1.240 | −852.360 |
| S8 | Lens | 5.928 | 0.368 | | | 1.392 | |
| S9 | Fifth | −5.979 | 0.592 | 1.546 | 56.110 | 1.555 | 3.794 |
| S10 | Lens | −1.592 | 0.025 | | | 1.930 | |
| S11 | Sixth | −9.315 | 0.245 | 1.546 | 56.110 | 1.933 | 593.968 |
| S12 | Lens | −9.139 | 0.025 | | | 2.344 | |
| S13 | Seventh | −8.585 | 0.400 | 1.546 | 56.110 | 2.542 | 151.765 |
| S14 | Lens | −7.907 | 0.213 | | | 2.709 | |
| S15 | Eighth | −6.024 | 0.350 | 1.546 | 56.110 | 2.850 | −2.727 |
| S16 | Lens | 2.018 | 0.166 | | | 3.107 | |
| S17 | Filter | Infinity | 0.210 | 1.518 | 64.170 | 3.365 | |
| S18 | | Infinity | 0.640 | | | 3.425 | |
| S19 | Imaging Plane | Infinity | 0.010 | | | 3.732 | |

TABLE 8

| | K | A | B | C | D | E | F | G | H | J |
|---|---|---|---|---|---|---|---|---|---|---|
| S1 | −1.0490 | 0.0236 | −0.0005 | 0.0212 | −0.0582 | 0.0910 | −0.0876 | 0.0501 | −0.0161 | 0.0021 |
| S2 | 2.3743 | −0.0341 | 0.0124 | −0.0159 | 0.0539 | −0.1457 | 0.2109 | −0.1724 | 0.0747 | −0.0134 |
| S3 | −4.7433 | −0.0903 | 0.1464 | −0.4011 | 1.2168 | −2.3765 | 2.8712 | −2.0841 | 0.8352 | −0.1419 |
| S4 | −6.2925 | −0.0640 | 0.1056 | −0.2184 | 0.6866 | −1.4618 | 1.9598 | −1.5772 | 0.6971 | −0.1280 |
| S5 | −9.8916 | −0.0468 | 0.0408 | −0.3674 | 1.1028 | −2.1258 | 2.5819 | −1.9021 | 0.7734 | −0.1315 |
| S6 | −8.1202 | −0.0882 | 0.1009 | −0.3414 | 0.6842 | −1.0456 | 1.0799 | −0.6903 | 0.2467 | −0.0380 |
| S7 | 6.2729 | −0.2387 | 0.2563 | −0.8267 | 1.9817 | −3.1645 | 3.2115 | −1.9744 | 0.6695 | −0.0962 |
| S8 | −14.0886 | −0.1771 | 0.1332 | −0.3174 | 0.5995 | −0.7506 | 0.6128 | −0.3086 | 0.0857 | −0.0099 |
| S9 | −27.6060 | −0.0394 | 0.0660 | −0.1566 | 0.1728 | −0.1182 | 0.0592 | −0.0224 | 0.0052 | −0.0005 |
| S10 | −1.3770 | 0.1197 | −0.1836 | 0.1515 | −0.0866 | 0.0397 | −0.0128 | 0.0025 | −0.0003 | 0.0000 |
| S11 | −3.6588 | 0.0779 | −0.1747 | 0.1360 | −0.0766 | 0.0296 | −0.0071 | 0.0010 | −0.0001 | 0.0000 |
| S12 | 6.1498 | −0.0023 | 0.0059 | −0.0058 | 0.0019 | −0.0003 | 0.0000 | 0.0000 | 0.0000 | 0.0000 |
| S13 | −3.7814 | 0.0568 | −0.0860 | 0.0552 | −0.0201 | 0.0044 | −0.0006 | 0.0000 | 0.0000 | 0.0000 |
| S14 | −38.0361 | 0.1393 | −0.1879 | 0.1196 | −0.0430 | 0.0092 | −0.0012 | 0.0001 | 0.0000 | 0.0000 |
| S15 | −118.819 | −0.0868 | −0.0198 | 0.0691 | −0.0393 | 0.0111 | −0.0018 | 0.0002 | 0.0000 | 0.0000 |
| S16 | −1.2415 | −0.1931 | 0.0997 | −0.0352 | 0.0084 | −0.0014 | 0.0002 | 0.0000 | 0.0000 | 0.0000 |

Example 5

Figure 9:
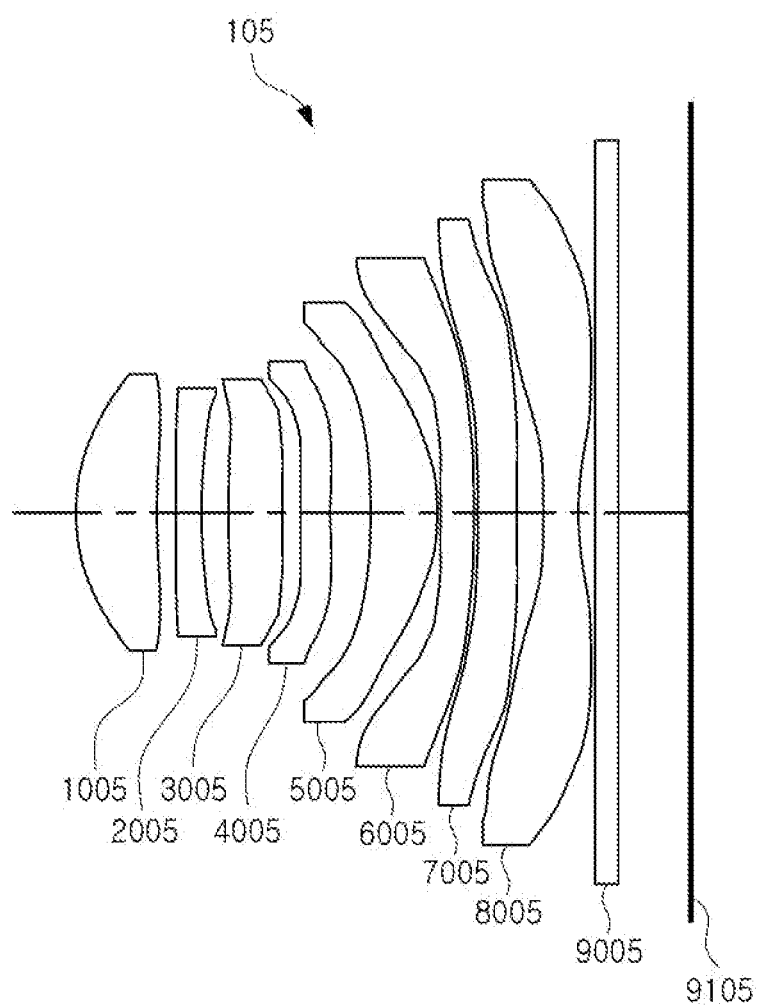
FIG. 9 is a view illustrating a fifth example of an optical imaging system.
Figure 10:
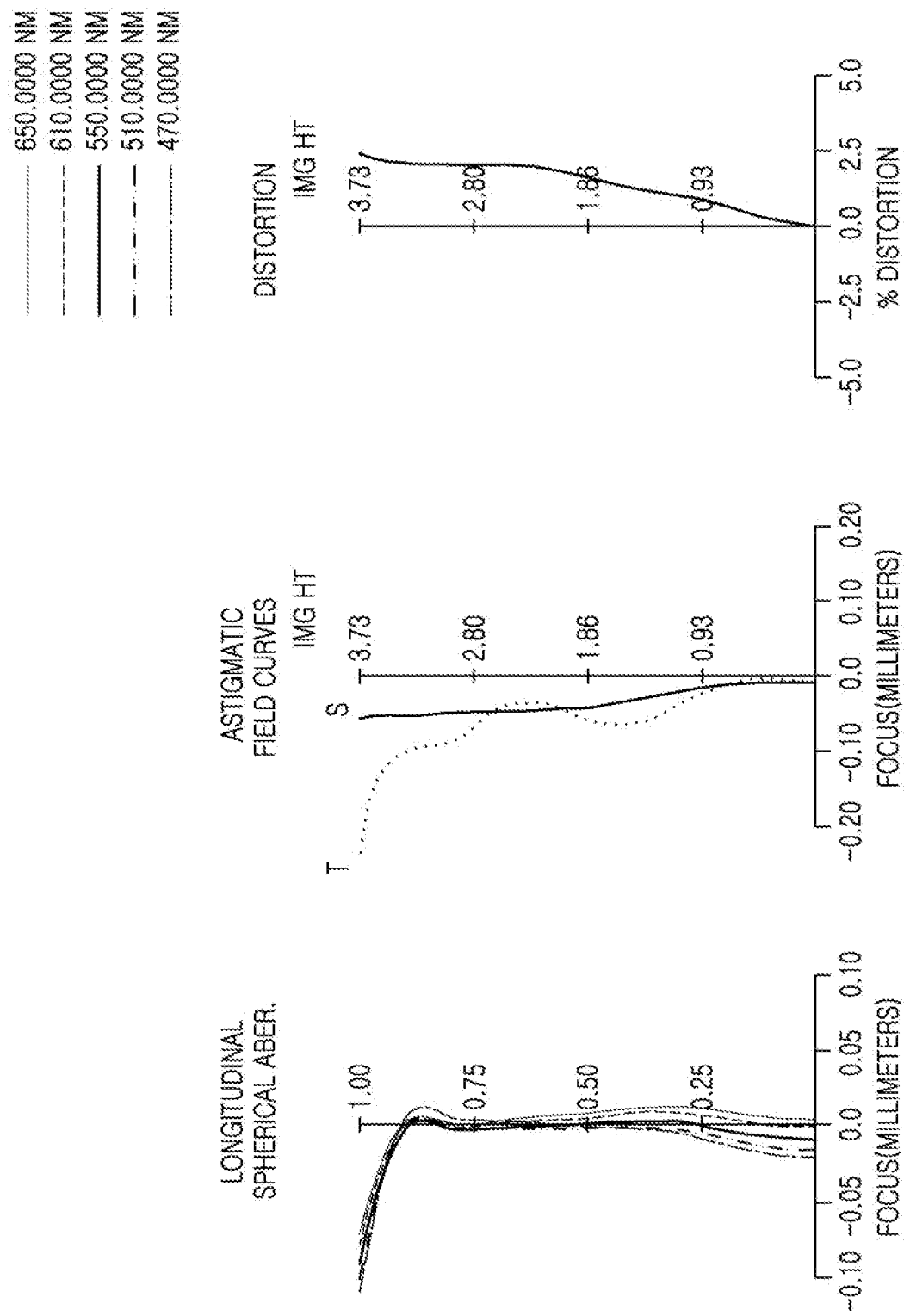
FIG. 10 illustrates aberration curves of the optical imaging system of FIG. 9.

FIG. 9 is a view illustrating a fifth example of an optical imaging system, and FIG. 10 illustrates aberration curves of the optical imaging system of FIG. 9.

An optical imaging system 105 includes a first lens 1005, a second lens 2005, a third lens 3005, a fourth lens 4005, a fifth lens 5005, a sixth lens 6005, a seventh lens 7005, and an eighth lens 8005.

The first lens 1005 has a positive refractive power, a convex object-side surface, and a concave image-side surface. The second lens 2005 has a negative refractive power, a convex object-side surface, and a concave image-side surface. The third lens 3005 has a positive refractive power, a convex object-side surface, and a concave image-side surface. The fourth lens 4005 has a positive refractive power, a convex object-side surface, and a concave image-side surface. In addition, at least one inflection point is formed on either one or both of the object-side surface and the image-side surface of the fourth lens 4005. The fifth lens 5005 has a positive refractive power, a concave object-side surface, and a convex image-side surface. The sixth lens 6005 has a positive refractive power, a concave object-side surface, and a convex image-side surface. In addition, at least one inflection point is formed on either one or both of the object-side surface and the image-side surface of the sixth lens 6005. The seventh lens 7005 has a positive refractive power, a concave object-side surface, and a convex image-side surface. In addition, at least one inflection point is formed on either one or both of the object-side surface and the image-side surface of the seventh lens 7005. The eighth lens 8005 has a negative refractive power, a concave object-side surface, and a concave image-side surface. In addition, at least one inflection point is formed on either one or both of the object-side surface and the image-side surface of the eighth lens 8005.

The optical imaging system 105 further includes a stop, a filter 9005, and an image sensor 9105. The stop is disposed between the first lens 1005 and the second lens 2005 to adjust an amount of light incident on the image sensor 9105. The filter 9005 is disposed between the eighth lens 8005 and the image sensor 9105 to block infrared rays. The image sensor 9105 forms an imaging plane on which an image of a subject is formed. Although not illustrated in FIG. 9, the stop is disposed at a distance of 0.894 mm from the object-side surface of the first lens 1005 toward the imaging plane of the optical imaging system 105. This distance is equal to TTL-SL and can be calculated from the values of TTL and SL for Example 5 listed in Table 21 that appears later in this application.

Table 9 below shows physical properties of the lenses and other elements of the optical imaging system of FIG. 9, and Table 10 below shows aspherical surface coefficients of the lenses of FIG. 9. Both surfaces of all of the lenses of FIG. 9 are aspherical.

TABLE 9

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.822 | 0.728 | 1.546 | 56.110 | 1.270 | 4.034 |
| S2 | Lens | 9.061 | 0.166 | | | 1.220 | |
| S3 (Stop) | Second | 20.107 | 0.230 | 1.677 | 19.240 | 1.138 | −9.156 |
| S4 | Lens | 4.716 | 0.243 | | | 1.086 | |
| S5 | Third | 7.071 | 0.479 | 1.546 | 56.110 | 1.150 | 27.439 |
| S6 | Lens | 13.072 | 0.166 | | | 1.230 | |
| S7 | Fourth | 6.501 | 0.263 | 1.677 | 19.270 | 1.238 | 318.073 |
| S8 | Lens | 6.594 | 0.360 | | | 1.391 | |
| S9 | Fifth | −5.853 | 0.602 | 1.546 | 56.110 | 1.554 | 3.965 |
| S10 | Lens | −1.638 | 0.025 | | | 1.930 | |
| S11 | Sixth | −11.696 | 0.300 | 1.546 | 56.110 | 1.930 | 69.598 |
| S12 | Lens | −9.024 | 0.032 | | | 2.341 | |
| S13 | Seventh | −8.191 | 0.350 | 1.546 | 56.110 | 2.511 | 191.678 |
| S14 | Lens | −7.711 | 0.236 | | | 2.694 | |
| S15 | Eighth | −5.715 | 0.300 | 1.546 | 56.110 | 2.850 | −2.637 |
| S16 | Lens | 1.960 | 0.155 | | | 3.055 | |

TABLE 9-continued

| Surface No. | Element | Radius of Curvature | Thickness/ Distance | Index of Refraction | Abbe Number | Effective Aperture Radius | Focal Length |
|---|---|---|---|---|---|---|---|
| S17 | Filter | Infinity | 0.210 | 1.518 | 64.170 | 3.348 | |
| S18 | | Infinity | 0.640 | | | 3.413 | |
| S19 | Imaging Plane | Infinity | 0.010 | | | 3.750 | |

TABLE 10

| | K | A | B | C | D | E | F | G | H | J |
|---|---|---|---|---|---|---|---|---|---|---|
| S1 | −1.0516 | 0.0478 | −0.1400 | 0.4507 | −0.8658 | 1.0508 | −0.8128 | 0.3880 | −0.1047 | 0.0122 |
| S2 | 2.6211 | −0.0520 | 0.1658 | −0.6445 | 1.5661 | −2.4077 | 2.3313 | −1.3811 | 0.4571 | −0.0648 |
| S3 | −4.7433 | −0.1204 | 0.4379 | −1.6735 | 4.4706 | −7.5899 | 8.1491 | −5.3562 | 1.9677 | −0.3093 |
| S4 | −6.8920 | −0.0498 | 0.0136 | 0.2601 | −0.9246 | 1.8448 | −2.2435 | 1.6637 | −0.6932 | 0.1268 |
| S5 | −10.0000 | −0.0608 | 0.1863 | −1.0842 | 3.1311 | −5.6676 | 6.4248 | −4.4193 | 1.6834 | −0.2706 |
| S6 | −8.1202 | −0.0944 | 0.1696 | −0.6334 | 1.4474 | −2.2710 | 2.2665 | −1.3639 | 0.4530 | −0.0643 |
| S7 | 6.4576 | −0.2676 | 0.4809 | 1.6650 | 3.8679 | −5.7764 | 5.4152 | −3.0670 | 0.9586 | −0.1272 |
| S8 | −15.2310 | −0.1905 | 0.2070 | −0.5437 | 1.0278 | −1.2629 | 0.9947 | −0.4787 | 0.1269 | −0.0141 |
| S9 | −27.6060 | −0.0567 | 0.1518 | −0.3511 | 0.4196 | −0.3130 | 0.1569 | −0.0524 | 0.0103 | −0.0009 |
| S10 | −1.3479 | 0.1276 | −0.1941 | 0.1568 | −0.0889 | 0.0411 | −0.0134 | 0.0026 | −0.0003 | 0.0000 |
| S11 | −3.6588 | 0.1046 | −0.2429 | 0.2096 | −0.1205 | 0.0453 | −0.0106 | 0.0015 | −0.0001 | 0.0000 |
| S12 | 3.1984 | −0.0030 | 0.0064 | −0.0062 | 0.0019 | −0.0002 | 0.0000 | 0.0000 | 0.0000 | 0.0000 |
| S13 | −3.2267 | 0.0612 | −0.0916 | 0.0561 | −0.0193 | 0.0040 | −0.0005 | 0.0000 | 0.0000 | 0.0000 |
| S14 | −42.9141 | 0.1830 | −0.2749 | 0.1909 | −0.0746 | 0.0175 | −0.0025 | 0.0002 | 0.0000 | 0.0000 |
| S15 | −99.0000 | −0.0865 | −0.0455 | 0.0990 | −0.0543 | 0.0152 | −0.0025 | 0.0002 | 0.0000 | 0.0000 |
| S16 | −1.2931 | −0.2251 | 0.1293 | −0.0489 | 0.0122 | −0.0021 | 0.0002 | 0.0000 | 0.0000 | 0.0000 |

Example 6

Figure 11:
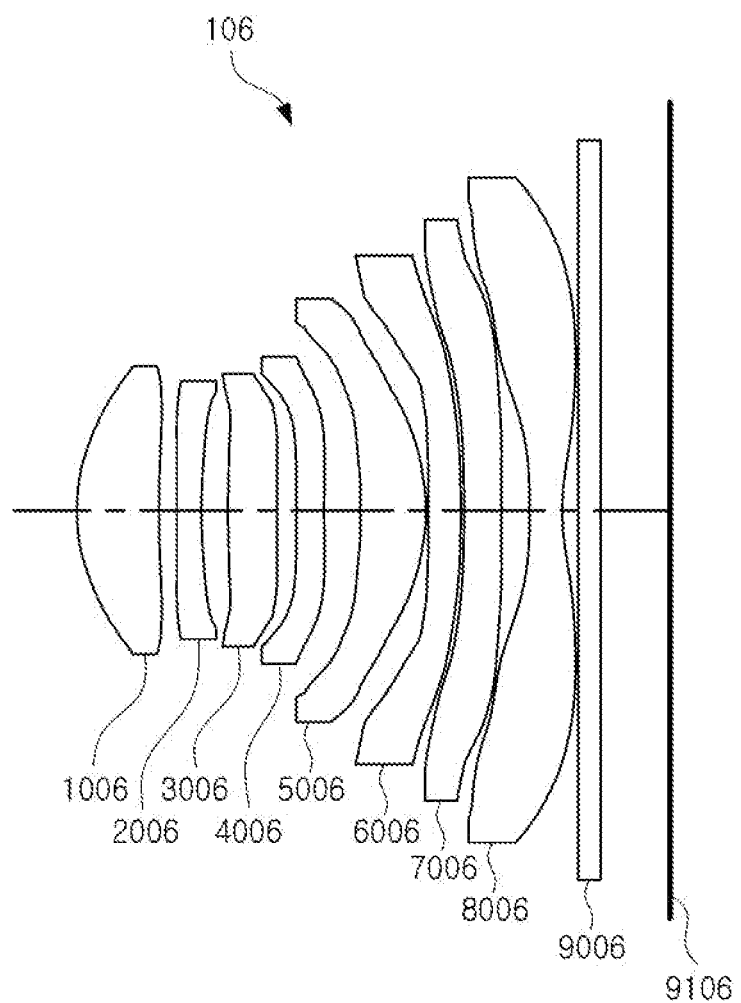
FIG. 11 is a view illustrating a sixth example of an optical imaging system.
Figure 12:
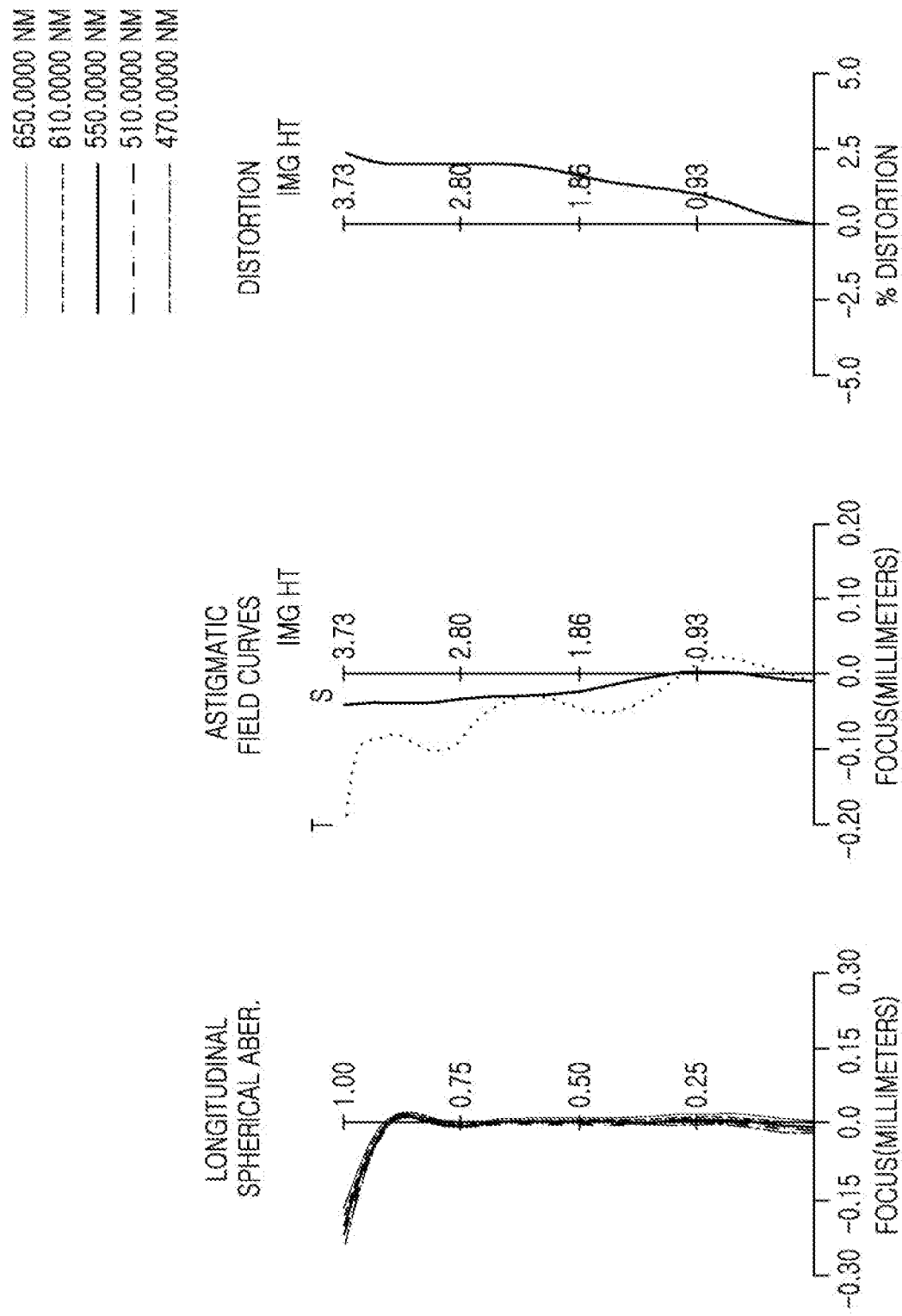
FIG. 12 illustrates aberration curves of the optical imaging system of FIG. 11.

FIG. 11 is a view illustrating a sixth example of an optical imaging system, and FIG. 12 illustrates aberration curves of the optical imaging system of FIG. 11.

An optical imaging system 106 includes a first lens 1006, a second lens 2006, a third lens 3006, a fourth lens 4006, a fifth lens 5006, a sixth lens 6006, a seventh lens 7006, and an eighth lens 8006.

The first lens 1006 has a positive refractive power, a convex object-side surface, and a concave image-side surface. The second lens 2006 has a negative refractive power, a convex object-side surface, and a concave image-side surface. The third lens 3006 has a positive refractive power, a convex object-side surface, and a concave image-side surface. The fourth lens 4006 has a negative refractive power, a convex object-side surface, and a concave image-side surface. In addition, at least one inflection point is formed on either one or both of the object-side surface and the image-side surface of the fourth lens 4006. The fifth lens 5006 has a positive refractive power, a concave object-side surface, and a convex image-side surface. The sixth lens 6006 has a positive refractive power, a concave object-side surface, and a convex image-side surface. In addition, at least one inflection point is formed on either one or both of the object-side surface and the image-side surface of the sixth lens 6006. The seventh lens 7006 has a positive refractive power, a concave object-side surface, and a convex image-side surface. In addition, at least one inflection point is formed on either one or both of the object-side surface and the image-side surface of the seventh lens 7006. The eighth lens 8006 has a negative refractive power, a concave object-side surface, and a concave image-side surface. In addition, at least one inflection point is formed on either one or both of the object-side surface and the image-side surface of the eighth lens 8006.

The optical imaging system 106 further includes a stop, a filter 9006, and an image sensor 9106. The stop is disposed between the first lens 1006 and the second lens 2006 to adjust an amount of light incident on the image sensor 9106. The filter 9006 is disposed between the eighth lens 8006 and the image sensor 9106 to block infrared rays. The image sensor 9106 forms an imaging plane on which an image of a subject is formed. Although not illustrated in FIG. 11, the stop is disposed at a distance of 0.916 mm from the object-side surface of the first lens 1006 toward the imaging plane of the optical imaging system 106. This distance is equal to TTL-SL and can be calculated from the values of TTL and SL for Example 6 listed in Table 21 that appears later in this application.

Table 11 below shows physical properties of the lenses and other elements of the optical imaging system of FIG. 11, and Table 12 below shows aspherical surface coefficients of the lenses of FIG. 11. Both surfaces of all of the lenses of FIG. 11 are aspherical.

TABLE 11

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.847 | 0.754 | 1.546 | 56.110 | 1.320 | 4.094 |
| S2 | Lens | 9.121 | 0.162 | | | 1.278 | |
| S3 (Stop) | Second | 17.599 | 0.230 | 1.677 | 19.240 | 1.181 | −9.049 |
| S4 | Lens | 4.520 | 0.244 | | | 1.100 | |

TABLE 11-continued

| Surface No. | Element | Radius of Curvature | Thickness/ Distance | Index of Refraction | Abbe Number | Effective Aperture Radius | Focal Length |
|---|---|---|---|---|---|---|---|
| S5 | Third | 6.403 | 0.455 | 1.546 | 56.110 | 1.170 | 23.523 |
| S6 | Lens | 12.448 | 0.173 | | | 1.250 | |
| S7 | Fourth | 7.478 | 0.262 | 1.677 | 19.270 | 1.250 | −321.626 |
| S8 | Lens | 7.128 | 0.339 | | | 1.410 | |
| S9 | Fifth | −6.029 | 0.603 | 1.546 | 56.110 | 1.570 | 4.061 |
| S10 | Lens | −1.678 | 0.025 | | | 1.950 | |
| S11 | Sixth | −17.836 | 0.300 | 1.546 | 56.110 | 1.980 | 24.608 |
| S12 | Lens | −7.708 | 0.025 | | | 2.341 | |
| S13 | Seventh | −7.022 | 0.350 | 1.546 | 56.110 | 2.475 | 580.584 |
| S14 | Lens | −6.991 | 0.253 | | | 2.675 | |
| S15 | Eighth | −5.625 | 0.300 | 1.546 | 56.110 | 2.850 | −2.583 |
| S16 | Lens | 1.917 | 0.152 | | | 3.060 | |
| S17 | Filter | Infinity | 0.210 | 1.518 | 64.170 | 3.350 | |
| S18 | | Infinity | 0.640 | | | 3.415 | |
| S19 | Imaging Plane | Infinity | 0.010 | | | 3.765 | |

TABLE 12

| | K | A | B | C | D | E | F | G | H | J |
|---|---|---|---|---|---|---|---|---|---|---|
| S1 | −1.0515 | 0.0418 | −0.0820 | 0.1925 | −0.2543 | 0.1923 | −0.0752 | 0.0071 | 0.0040 | −0.0010 |
| S2 | 3.6745 | −0.0613 | 0.2225 | −0.7907 | 1.7333 | −2.4105 | 2.1242 | −1.1513 | 0.3501 | −0.0457 |
| S3 | −4.7433 | −0.1131 | 0.4407 | −1.7856 | 4.8220 | −8.1035 | 8.5172 | −5.4431 | 1.9346 | −0.2931 |
| S4 | −7.1170 | −0.0380 | −0.0420 | 0.4519 | −1.4690 | 2.9676 | −3.7762 | 2.9509 | −1.2921 | 0.2441 |
| S5 | −10.0000 | −0.0813 | 0.4039 | −2.1741 | 6.2263 | −11.0124 | 12.1279 | −8.0775 | 2.9710 | −0.4610 |
| S6 | −8.1202 | −0.0930 | 0.2154 | −0.8812 | 2.0731 | −3.2144 | 3.1419 | −1.8477 | 0.5981 | −0.0824 |
| S7 | 7.4360 | −0.2802 | 0.6256 | −2.2575 | 5.2300 | −7.7298 | 7.1778 | −4.0296 | 1.2473 | −0.1635 |
| S8 | −18.0377 | −0.1986 | 0.2619 | −0.7200 | 1.3451 | −1.6252 | 1.2637 | −0.6035 | 0.1594 | −0.0176 |
| S9 | −27.6060 | −0.0669 | 0.2057 | −0.4831 | 0.5917 | −0.4462 | 0.2209 | −0.0712 | 0.0135 | −0.0011 |
| S10 | −1.2918 | 0.1394 | −0.2240 | 0.1863 | −0.1077 | 0.0497 | −0.0161 | 0.0032 | −0.0003 | 0.0000 |
| S11 | −3.6588 | 0.1104 | −0.2597 | 0.2419 | −0.1481 | 0.0577 | −0.0137 | 0.0019 | −0.0001 | 0.0000 |
| S12 | −0.6513 | −0.0169 | 0.0325 | −0.0266 | 0.0100 | −0.0020 | 0.0002 | 0.0000 | 0.0000 | 0.0000 |
| S13 | −4.5082 | 0.0824 | −0.1191 | 0.0703 | −0.0231 | 0.0046 | −0.0005 | 0.0000 | 0.0000 | 0.0000 |
| S14 | −37.6498 | 0.2062 | −0.3215 | 0.2315 | −0.0934 | 0.0226 | −0.0034 | 0.0003 | 0.0000 | 0.0000 |
| S15 | −99.0000 | −0.1155 | −0.0315 | 0.1041 | −0.0604 | 0.0174 | −0.0029 | 0.0003 | 0.0000 | 0.0000 |
| S16 | −1.2552 | −0.2449 | 0.1488 | −0.0586 | 0.0151 | −0.0026 | 0.0003 | 0.0000 | 0.0000 | 0.0000 |

Example 7

Figure 13:
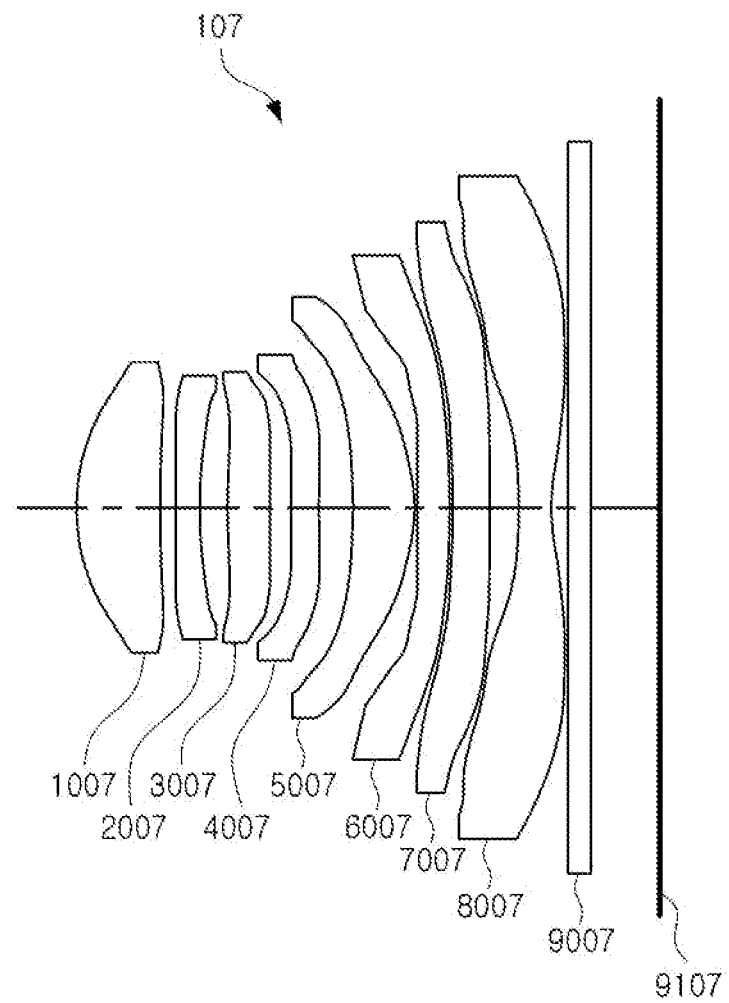
FIG. 13 is a view illustrating a seventh example of an optical imaging system.
Figure 14:
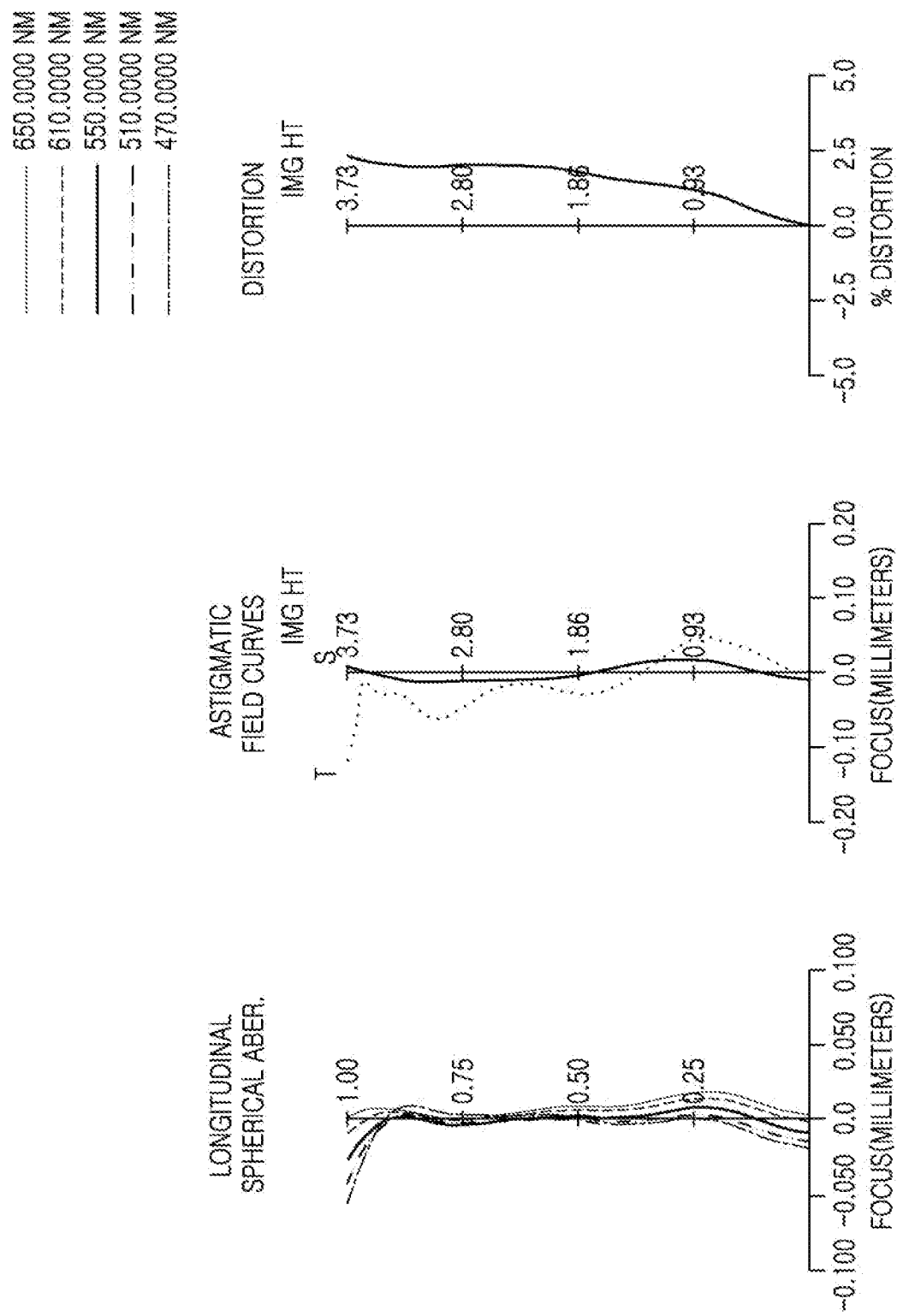
FIG. 14 illustrates aberration curves of the optical imaging system of FIG. 13.

FIG. 13 is a view illustrating a seventh example of an optical imaging system, and FIG. 14 illustrates aberration curves of the optical imaging system of FIG. 13.

An optical imaging system 107 includes a first lens 1007, a second 2007, a third lens 3007, a fourth lens 4007, a fifth lens 5007, a sixth lens 6007, a seventh lens 7007, and an eighth lens 8007.

The first lens 1007 has a positive refractive power, a convex object-side surface, and a concave image-side surface. The second lens 2007 has a negative refractive power, a convex object-side surface, and a concave image-side surface. The third lens 3007 has a positive refractive power, a convex object-side surface, and a concave image-side surface. The fourth lens 4007 has a negative refractive power, a convex object-side surface, and a concave image-side surface. In addition, at least one inflection point is formed on either one or both of the object-side surface and the image-side surface of the fourth lens 4007. The fifth lens 5007 has a positive refractive power, a concave object-side surface, and a convex image-side surface. The sixth lens 6007 has a positive refractive power, a concave object-side surface, and a convex image-side surface. In addition, at least one inflection point is formed on either one or both of the object-side surface and the image-side surface of the sixth lens 6007. The seventh lens 7007 has a positive refractive power, a concave object-side surface, and a convex image-side surface. In addition, at least one inflection point is formed on either one or both of the object-side surface and the image-side surface of the seventh lens 7007. The eighth lens 8007 has a negative refractive power, a concave object-side surface, and a concave image-side surface. In addition, at least one inflection point is formed on either one or both of the object-side surface and the image-side surface of the eighth lens 8007.

The optical imaging system 107 further includes a stop, a filter 9007, and an image sensor 9107. The stop is disposed between the first lens 1007 and the second lens 2007 to adjust an amount of light incident on the image sensor 9107. The filter 9007 is disposed between the eighth lens 8007 and the image sensor 9107 to block infrared rays. The image sensor 9107 forms an imaging plane on which an image of a subject is formed. Although not illustrated in FIG. 13, the stop is disposed at a distance of 0.9205 mm from the object-side surface of the first lens 1007 toward the imaging plane of the optical imaging system 107. This distance is equal to TTL-SL and can be calculated from the values of TTL and SL for Example 7 listed in Table 21 that appears later in this application.

Table 13 below shows physical properties of the lenses and other elements of the optical imaging system of FIG. 13, and Table 14 below shows aspherical surface coefficients of the lenses of FIG. 13. Both surfaces of all of the lenses of FIG. 13 are aspherical.

TABLE 13

| Surface No. | Element | Radius of Curvature | Thickness/ Distance | Index of Refraction | Abbe Number | Effective Aperture Radius | Focal Length |
|---|---|---|---|---|---|---|---|
| S1 | First | 1.871 | 0.778 | 1.546 | 56.110 | 1.350 | 4.157 |
| S2 | Lens | 9.080 | 0.142 | | | 1.309 | |
| S3 (Stop) | Second | 14.426 | 0.230 | 1.677 | 19.240 | 1.215 | −9.158 |
| S4 | Lens | 4.308 | 0.246 | | | 1.100 | |
| S5 | Third | 5.887 | 0.396 | 1.546 | 56.110 | 1.170 | 21.620 |
| S6 | Lens | 11.468 | 0.197 | | | 1.250 | |
| S7 | Fourth | 7.406 | 0.256 | 1.677 | 19.270 | 1.250 | −115.317 |
| S8 | Lens | 6.670 | 0.318 | | | 1.410 | |
| S9 | Fifth | −6.091 | 0.567 | 1.546 | 56.110 | 1.570 | 4.041 |
| S10 | Lens | −1.673 | 0.025 | | | 1.950 | |
| S11 | Sixth | −29.144 | 0.300 | 1.546 | 56.110 | 1.980 | 21.050 |
| S12 | Lens | −8.272 | 0.025 | | | 2.341 | |
| S13 | Seventh | −7.714 | 0.350 | 1.546 | 56.110 | 2.474 | 167.740 |
| S14 | Lens | −7.228 | 0.264 | | | 2.647 | |
| S15 | Eighth | −6.330 | 0.300 | 1.546 | 56.110 | 2.850 | −2.597 |
| S16 | Lens | 1.858 | 0.153 | | | 3.070 | |
| S17 | Filter | Infinity | 0.210 | 1.518 | 64.170 | 3.323 | |
| S18 | | Infinity | 0.640 | | | 3.392 | |
| S19 | Imaging Plane | Infinity | 0.010 | | | 3.789 | |

TABLE 14

| | K | A | B | C | D | E | F | G | H | J |
|---|---|---|---|---|---|---|---|---|---|---|
| S1 | −1.0633 | 0.0433 | −0.1029 | 0.2763 | −0.4432 | 0.4446 | −0.2800 | 0.1065 | −0.0224 | 0.0020 |
| S2 | 5.7198 | −0.0446 | 0.0892 | −0.2735 | 0.5366 | −0.6849 | 0.5629 | −0.2886 | 0.0840 | −0.0106 |
| S3 | −4.7433 | −0.0954 | 0.3142 | −1.2053 | 3.1368 | −5.0428 | 5.0474 | −3.0623 | 1.0313 | −0.1479 |
| S4 | −6.8939 | −0.0489 | 0.0707 | 0.0420 | −0.6661 | 2.0606 | −3.2101 | 2.7869 | −1.2842 | 0.2464 |
| S5 | −9.5450 | −0.0840 | 0.4445 | −2.3444 | 6.5487 | −11.2592 | 12.0270 | −7.7610 | 2.7681 | −0.4176 |
| S6 | −8.1202 | −0.0609 | −0.0304 | 0.1542 | −0.5663 | 0.9636 | −0.9982 | 0.6448 | −0.2320 | 0.0344 |
| S7 | 8.3930 | −0.2820 | 0.6104 | −2.0586 | 4.4420 | −6.1262 | 5.3184 | −2.7949 | 0.8116 | −0.1003 |
| S8 | −16.9723 | −0.2080 | 0.3147 | −0.8767 | 1.6222 | −1.9279 | 1.4724 | −0.6933 | 0.1816 | −0.0200 |
| S9 | −27.6060 | −0.0707 | 0.2362 | −0.5507 | 0.6652 | −0.4825 | 0.2246 | −0.0676 | 0.0120 | −0.0010 |
| S10 | −1.2807 | 0.1478 | −0.2466 | 0.2136 | −0.1292 | 0.0622 | −0.0209 | 0.0042 | −0.0005 | 0.0000 |
| S11 | −3.6588 | 0.1163 | −0.2758 | 0.2744 | −0.1767 | 0.0706 | −0.0171 | 0.0024 | −0.0002 | 0.0000 |
| S12 | 1.5936 | −0.0208 | 0.0436 | −0.0355 | 0.0134 | −0.0028 | 0.0003 | 0.0000 | 0.0000 | 0.0000 |
| S13 | −4.2761 | 0.0942 | −0.1361 | 0.0794 | −0.0254 | 0.0049 | −0.0006 | 0.0000 | 0.0000 | 0.0000 |
| S14 | −43.4471 | 0.2139 | −0.3417 | 0.2495 | −0.1017 | 0.0248 | −0.0037 | 0.0003 | 0.0000 | 0.0000 |
| S15 | −99.0000 | −0.1257 | −0.0364 | 0.1176 | −0.0688 | 0.0200 | −0.0033 | 0.0003 | 0.0000 | 0.0000 |
| S16 | −1.3165 | −0.2595 | 0.1617 | −0.0644 | 0.0168 | −0.0029 | 0.0003 | 0.0000 | 0.0000 | 0.0000 |

Example 8

Figure 15:
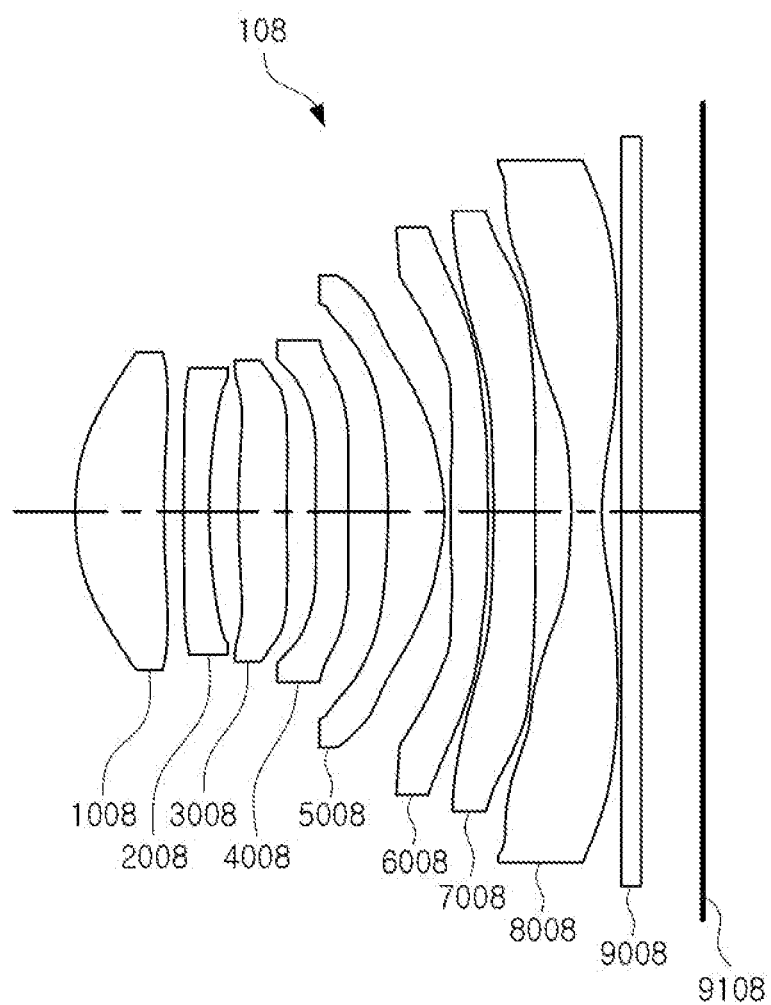
FIG. 15 is a view illustrating an eighth example of an optical imaging system.
Figure 16:
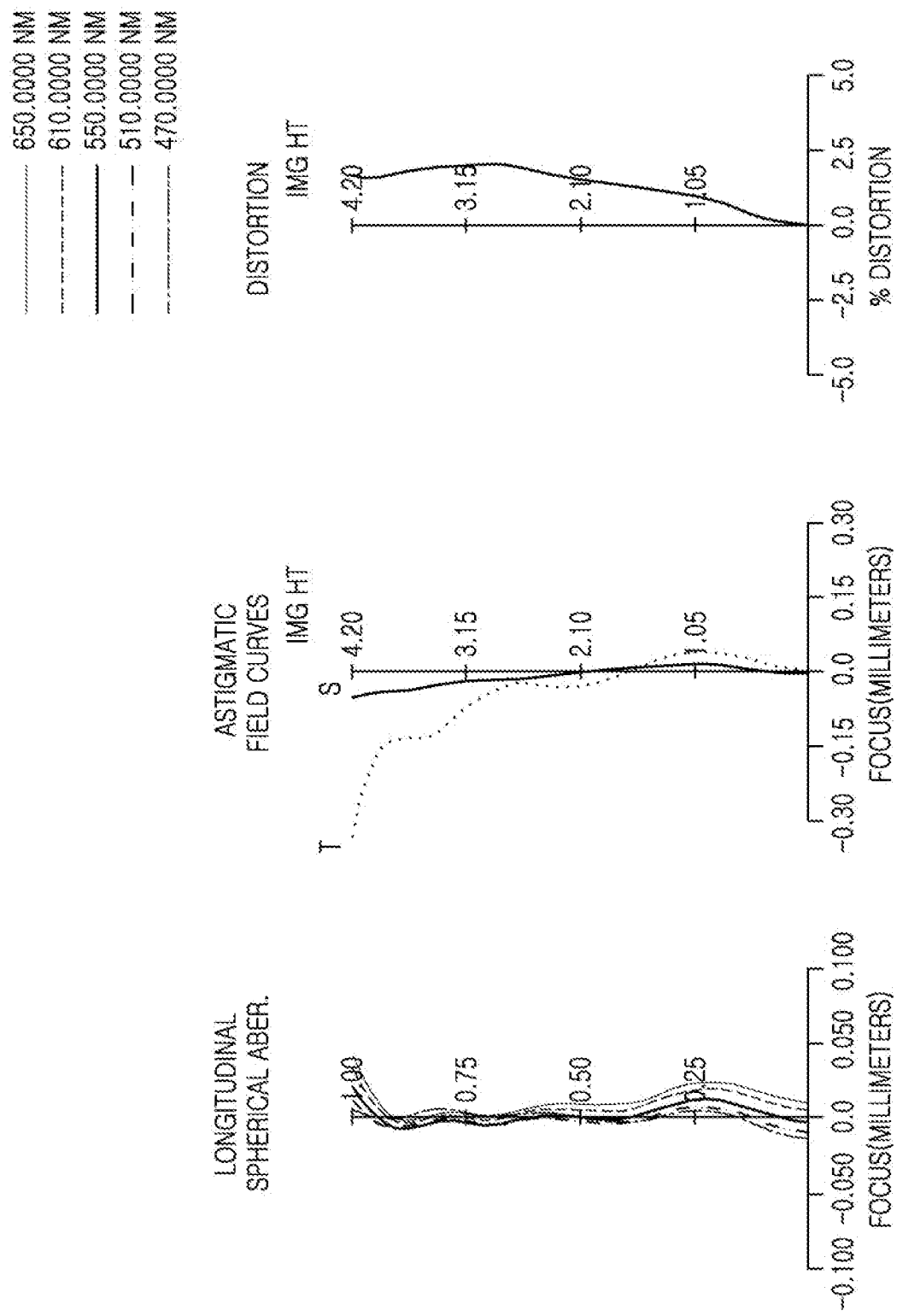
FIG. 16 illustrates aberration curves of the optical imaging system of FIG. 15.

FIG. 15 is a view illustrating an eighth example of an optical imaging system, and FIG. 16 illustrates aberration curves of the optical imaging system of FIG. 15.

An optical imaging system 108 includes a first lens 1008, a second lens 2008, a third lens 3008, a fourth lens 4008, a fifth lens 5008, a sixth lens 6008, a seventh lens 7008, and an eighth lens 8008.

The first lens 1008 has a positive refractive power, a convex object-side surface, and a concave image-side surface. The second lens 2008 has a negative refractive power, a convex object-side surface, and a concave image-side surface. The third lens 3008 has a positive refractive power, a convex object-side surface, and a concave image-side surface. The fourth lens 4008 has a negative refractive power, a convex object-side surface, and a concave image-side surface. In addition, at least one inflection point is formed on either one or both of the object-side surface and the image-side surface of the fourth lens 4008. The fifth lens 5008 has a positive refractive power, a concave object-side surface, and a convex image-side surface. The sixth lens 6008 has a positive refractive power, a convex object-side surface, and a convex image-side surface. In addition, at least one inflection point is formed on either one or both of the object-side surface and the image-side surface of the sixth lens 6008. The seventh lens 7008 has a negative refractive power, a concave object-side surface, and a convex image-side surface. In addition, at least one inflection point is formed on either one or both of the object-side surface and the image-side surface of the seventh lens 7008. The eighth lens 8008 has a negative refractive power, a concave object-side surface, and a concave image-side surface. In addition, at least one inflection point is formed on either one or both of the object-side surface and the image-side surface of the eighth lens 8008.

The optical imaging system 108 further includes a stop, a filter 9008, and an image sensor 9108. The stop is disposed between the first lens 1008 and the second lens 2008 to adjust an amount of light incident on the image sensor 9108. The filter 9008 is disposed between the eighth lens 8008 and the image sensor 9108 to block infrared rays. The image sensor 9108 forms an imaging plane on which an image of a subject is formed. Although not illustrated in FIG. 15, the stop is disposed at a distance of 1.126 mm from the object-side surface of the first lens 1008 toward the imaging plane of the optical imaging system 108. This distance is equal to TTL-SL and can be calculated from the values of TTL and SL for Example 8 listed in Table 21 that appears later in this application.

Table 15 below shows physical properties of the lenses and other elements of the optical imaging system of FIG. 15, and Table 16 below shows aspherical surface coefficients of the lenses of FIG. 15. Both surfaces of all of the lenses of FIG. 15 are aspherical.

TABLE 15

| Surface No. | Element | Radius of Curvature | Thickness/ Distance | Index of Refraction | Abbe Number | Effective Aperture Radius | Focal Length |
|---|---|---|---|---|---|---|---|
| S1 | First | 2.313 | 0.922 | 1.546 | 56.110 | 1.650 | 5.127 |
| S2 | Lens | 11.436 | 0.205 | | | 1.598 | |
| S3 (Stop) | Second | 17.537 | 0.261 | 1.677 | 19.240 | 1.483 | −10.792 |
| S4 | Lens | 5.126 | 0.300 | | | 1.386 | |
| S5 | Third | 6.766 | 0.506 | 1.546 | 56.110 | 1.474 | 23.325 |
| S6 | Lens | 14.057 | 0.294 | | | 1.575 | |
| S7 | Fourth | 9.529 | 0.341 | 1.677 | 19.270 | 1.575 | −127.525 |
| S8 | Lens | 8.458 | 0.408 | | | 1.777 | |
| S9 | Fifth | −7.543 | 0.585 | 1.546 | 56.110 | 1.978 | 5.311 |
| S10 | Lens | −2.152 | 0.067 | | | 2.457 | |
| S11 | Sixth | 55.842 | 0.386 | 1.546 | 56.110 | 2.495 | 18.597 |
| S12 | Lens | −12.379 | 0.060 | | | 2.950 | |
| S13 | Seventh | −8.660 | 0.432 | 1.546 | 56.110 | 2.930 | −178.940 |
| S14 | Lens | −9.670 | 0.368 | | | 3.121 | |
| S15 | Eighth | −7.724 | 0.317 | 1.546 | 56.110 | 3.591 | −3.200 |
| S16 | Lens | 2.292 | 0.188 | | | 3.649 | |
| S17 | Filter | Infinity | 0.210 | 1.518 | 64.170 | 3.836 | |
| S18 | | Infinity | 0.646 | | | 3.898 | |
| S19 | Imaging Plane | Infinity | 0.004 | | | 4.238 | |

TABLE 16

| | K | A | B | C | D | E | F | G | H | J |
|---|---|---|---|---|---|---|---|---|---|---|
| S1 | −1.0636 | 0.0197 | −0.0275 | 0.0526 | −0.0617 | 0.0469 | −0.0230 | 0.0070 | −0.0012 | 0.0001 |
| S2 | 5.7362 | −0.0344 | 0.0680 | −0.1062 | 0.0950 | −0.0483 | 0.0118 | −0.0001 | −0.0005 | 0.0001 |
| S3 | −4.7433 | −0.0521 | 0.1005 | −0.1930 | 0.2614 | −0.2300 | 0.1313 | −0.0469 | 0.0095 | −0.0008 |
| S4 | −6.5299 | −0.0138 | −0.0311 | 0.1552 | −0.3169 | 0.3807 | −0.2792 | 0.1236 | −0.0304 | 0.0032 |
| S5 | −9.9944 | −0.0353 | 0.1039 | −0.3590 | 0.6415 | −0.7112 | 0.4900 | −0.2036 | 0.0467 | −0.0045 |
| S6 | −8.1202 | −0.0303 | −0.0065 | 0.0085 | −0.0175 | 0.0083 | −0.0006 | −0.0002 | −0.0001 | 0.0000 |
| S7 | 8.1818 | −0.1384 | 0.1951 | −0.4447 | 0.6468 | −0.5970 | 0.3448 | −0.1202 | 0.0231 | −0.0019 |
| S8 | −16.7481 | −0.1042 | 0.1036 | −0.1904 | 0.2300 | −0.1763 | 0.0857 | −0.0254 | 0.0042 | −0.0003 |
| S9 | −27.6061 | −0.0269 | 0.0604 | −0.0932 | 0.0701 | −0.0314 | 0.0092 | −0.0018 | 0.0002 | 0.0000 |
| S10 | −1.2752 | 0.0694 | −0.0641 | 0.0286 | −0.0094 | 0.0031 | −0.0008 | 0.0001 | 0.0000 | 0.0000 |
| S11 | −3.6588 | 0.0558 | −0.0799 | 0.0493 | −0.0202 | 0.0052 | −0.0008 | 0.0001 | 0.0000 | 0.0000 |
| S12 | 8.2769 | −0.0069 | 0.0110 | −0.0064 | 0.0016 | −0.0002 | 0.0000 | 0.0000 | 0.0000 | 0.0000 |
| S13 | −4.6710 | 0.0496 | −0.0469 | 0.0178 | −0.0037 | 0.0004 | 0.0000 | 0.0000 | 0.0000 | 0.0000 |
| S14 | −46.5147 | 0.1094 | −0.1080 | 0.0490 | −0.0125 | 0.0019 | −0.0002 | 0.0000 | 0.0000 | 0.0000 |
| S15 | −99.0000 | −0.0704 | −0.0077 | 0.0224 | −0.0085 | 0.0016 | −0.0002 | 0.0000 | 0.0000 | 0.0000 |
| S16 | −1.3258 | −0.1343 | 0.0524 | −0.0128 | 0.0020 | −0.0002 | 0.0000 | 0.0000 | 0.0000 | 0.0000 |

Example 9

Figure 17:
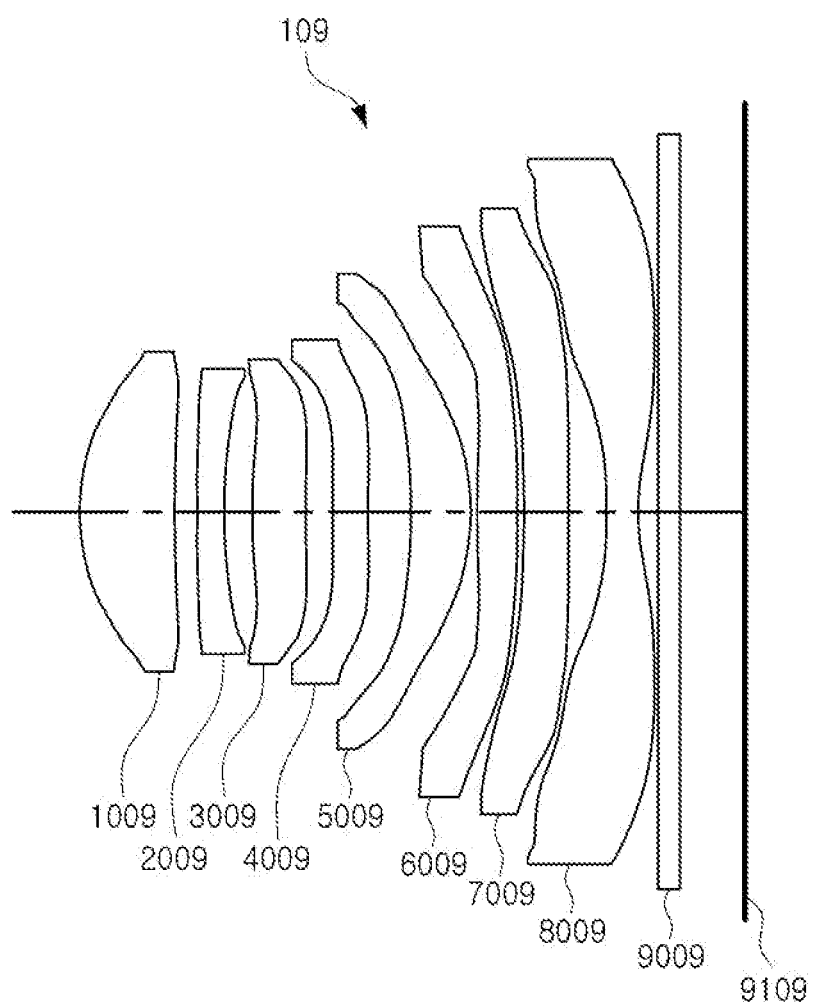
FIG. 17 is a view illustrating a ninth example of an optical imaging system.
Figure 18:
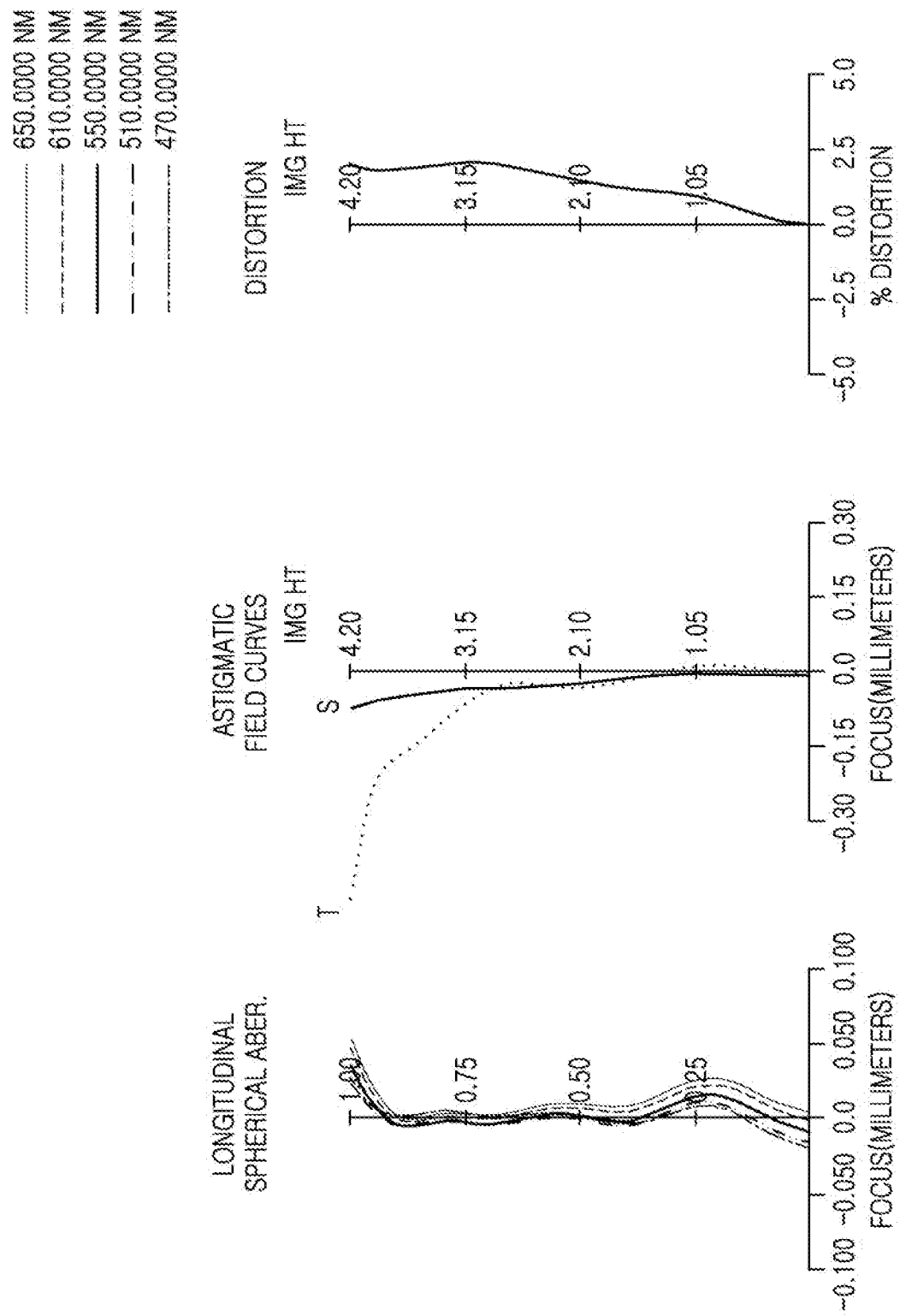
FIG. 18 illustrates aberration curves of the optical imaging system of FIG. 17.

FIG. 17 is a view illustrating a ninth example of an optical imaging system, and FIG. 18 illustrates aberration curves of the optical imaging system of FIG. 17.

An optical imaging system 109 includes a first lens 1009, a second lens 2009, a third lens 3009, a fourth lens 4009, a fifth lens 5009, a sixth lens 6009, a seventh lens 7009, and an eighth lens 8009.

The first lens 1009 has a positive refractive power, a convex object-side surface, and a concave image-side surface. The second lens 2009 has a negative refractive power, a convex object-side surface, and a concave image-side surface. The third lens 3009 has a positive refractive power, a convex object-side surface, and a concave image-side surface. The fourth lens 4009 has a negative refractive power, a convex object-side surface, and a concave image-side surface. In addition, at least one inflection point is formed on either one or both of the object-side surface and the image-side surface of the fourth lens 4009. The fifth lens 5009 has a positive refractive power, a concave object-side surface, and a convex image-side surface. The sixth lens 6009 has a positive refractive power, a convex object-side surface, and a convex image-side surface. In addition, at least one inflection point is formed on either one or both of the object-side surface and the image-side surface of the sixth lens 6009. The seventh lens 7009 has a negative refractive power, a concave object-side surface, and a convex image-side surface. In addition, at least one inflection point is formed on either one or both of the object-side surface and the image-side surface of the seventh lens 7009. The eighth lens 8009 has a negative refractive power, a concave object-side surface, and a concave image-side surface. In addition, at least one inflection point is formed on either one or both of the object-side surface and the image-side surface of the eighth lens 8009.

The optical imaging system 109 further includes a stop, a filter 9009, and an image sensor 9109. The stop is disposed between the first lens 1009 and the second lens 2009 to adjust an amount of light incident on the image sensor 9109. The filter 9009 is disposed between the eighth lens 8009 and the image sensor 9109 to block infrared rays. The image sensor 9109 forms an imaging plane on which an image of a subject is formed. Although not illustrated in FIG. 17, the stop is disposed at a distance of 1.155 mm from the object-side surface of the first lens 1009 toward the imaging plane of the optical imaging system 109. This distance is equal to TTL-SL and can be calculated from the values of TTL and SL for Example 9 listed in Table 21 that appears later in this application.

Table 17 below shows physical properties of the lenses and other elements of the optical imaging system of FIG. 17, and Table 18 below shows aspherical surface coefficients of the lenses of FIG. 17. Both surfaces of all of the lenses of FIG. 17 are aspherical.

An optical imaging system 110 includes a first lens 1010, a second lens 2010, a third lens 3010, a fourth lens 4010, a fifth lens 5010, a sixth lens 6010, a seventh lens 7010, and an eighth lens 8010.

The first lens 1010 has a positive refractive power, a convex object-side surface, and a concave image-side surface. The second lens 2010 has a negative refractive power, a convex object-side surface, and a concave image-side surface. The third lens 3010 has a positive refractive power, a convex object-side surface, and a concave image-side surface. The fourth lens 4010 has a negative refractive power, a convex object-side surface, and a concave image-side surface. In addition, at least one inflection point is formed on either one or both of the object-side surface and the image-side surface of the fourth lens 4010. The fifth lens 5010 has a positive refractive power, a concave object-side surface, and a convex image-side surface. The sixth lens

TABLE 17

| Surface No. | Element | Radius of Curvature | Thickness/ Distance | Index of Refraction | Abbe Number | Effective Aperture Radius | Focal Length |
|---|---|---|---|---|---|---|---|
| S1 | First | 2.312 | 0.933 | 1.546 | 56.110 | 1.650 | 5.112 |
| S2 | Lens | 11.561 | 0.222 | | | 1.596 | |
| S3 (Stop) | Second | 17.928 | 0.262 | 1.677 | 19.240 | 1.473 | −10.447 |
| S4 | Lens | 5.041 | 0.275 | | | 1.386 | |
| S5 | Third | 6.567 | 0.519 | 1.546 | 56.110 | 1.474 | 22.808 |
| S6 | Lens | 13.507 | 0.264 | | | 1.575 | |
| S7 | Fourth | 9.350 | 0.345 | 1.677 | 19.270 | 1.575 | −164.761 |
| S8 | Lens | 8.498 | 0.408 | | | 1.777 | |
| S9 | Fifth | −7.540 | 0.596 | 1.546 | 56.110 | 1.978 | 5.324 |
| S10 | Lens | −2.156 | 0.063 | | | 2.457 | |
| S11 | Sixth | 52.110 | 0.394 | 1.546 | 56.110 | 2.495 | 19.446 |
| S12 | Lens | −13.297 | 0.061 | | | 2.950 | |
| S13 | Seventh | −9.192 | 0.436 | 1.546 | 56.110 | 2.940 | −329.440 |
| S14 | Lens | −9.849 | 0.369 | | | 3.135 | |
| S15 | Eighth | −7.827 | 0.310 | 1.546 | 56.110 | 3.591 | −3.216 |
| S16 | Lens | 2.296 | 0.184 | | | 3.646 | |
| S17 | Filter | Infinity | 0.210 | 1.518 | 64.170 | 3.855 | |
| S18 | | Infinity | 0.640 | | | 3.916 | |
| S19 | Imaging Plane | Infinity | 0.010 | | | 4.225 | |

TABLE 18

| | K | A | B | C | D | E | F | G | H | J |
|---|---|---|---|---|---|---|---|---|---|---|
| S1 | −1.0622 | 0.0178 | −0.0128 | 0.0076 | 0.0100 | −0.0198 | 0.0144 | −0.0055 | 0.0011 | −0.0001 |
| S2 | 5.6036 | −0.0363 | 0.0809 | −0.1406 | 0.1463 | −0.0947 | 0.0379 | −0.0089 | 0.0011 | −0.0001 |
| S3 | −4.7433 | −0.0542 | 0.1147 | −0.2402 | 0.3450 | −0.3169 | 0.1866 | −0.0680 | 0.0140 | −0.0012 |
| S4 | −6.5766 | −0.0084 | −0.0570 | 0.2177 | −0.4092 | 0.4647 | −0.3247 | 0.1372 | −0.0322 | 0.0032 |
| S5 | −9.7993 | −0.0432 | 0.1425 | −0.4371 | 0.7280 | −0.7662 | 0.5092 | −0.2065 | 0.0466 | −0.0045 |
| S6 | −8.1202 | −0.0370 | 0.0257 | −0.0664 | 0.0888 | −0.0872 | 0.0531 | −0.0183 | 0.0033 | −0.0002 |
| S7 | 8.0131 | −0.1310 | 0.1547 | −0.3453 | 0.5063 | −0.4744 | 0.2772 | −0.0972 | 0.0187 | −0.0015 |
| S8 | −16.4648 | −0.1035 | 0.0974 | −0.1744 | 0.2085 | −0.1592 | 0.0775 | −0.0231 | 0.0038 | −0.0003 |
| S9 | −27.6060 | −0.0275 | 0.0645 | −0.1014 | 0.0782 | −0.0359 | 0.0106 | −0.0021 | 0.0002 | 0.0000 |
| S10 | −1.2775 | 0.0710 | −0.0663 | 0.0301 | −0.0099 | 0.0032 | −0.0008 | 0.0001 | 0.0000 | 0.0000 |
| S11 | −3.6588 | 0.0555 | −0.0795 | 0.0492 | −0.0202 | 0.0052 | −0.0008 | 0.0001 | 0.0000 | 0.0000 |
| S12 | 7.8127 | −0.0068 | 0.0108 | −0.0063 | 0.0016 | −0.0002 | 0.0000 | 0.0000 | 0.0000 | 0.0000 |
| S13 | −4.2234 | 0.0503 | −0.0474 | 0.0180 | −0.0037 | 0.0005 | 0.0000 | 0.0000 | 0.0000 | 0.0000 |
| S14 | −47.1881 | 0.1086 | −0.1068 | 0.0483 | −0.0123 | 0.0019 | −0.0002 | 0.0000 | 0.0000 | 0.0000 |
| S15 | −99.0000 | −0.0713 | −0.0073 | 0.0223 | −0.0085 | 0.0016 | −0.0002 | 0.0000 | 0.0000 | 0.0000 |
| S16 | −1.3383 | −0.1348 | 0.0526 | −0.0128 | 0.0020 | −0.0002 | 0.0000 | 0.0000 | 0.0000 | 0.0000 |

Example 10

Figure 19:
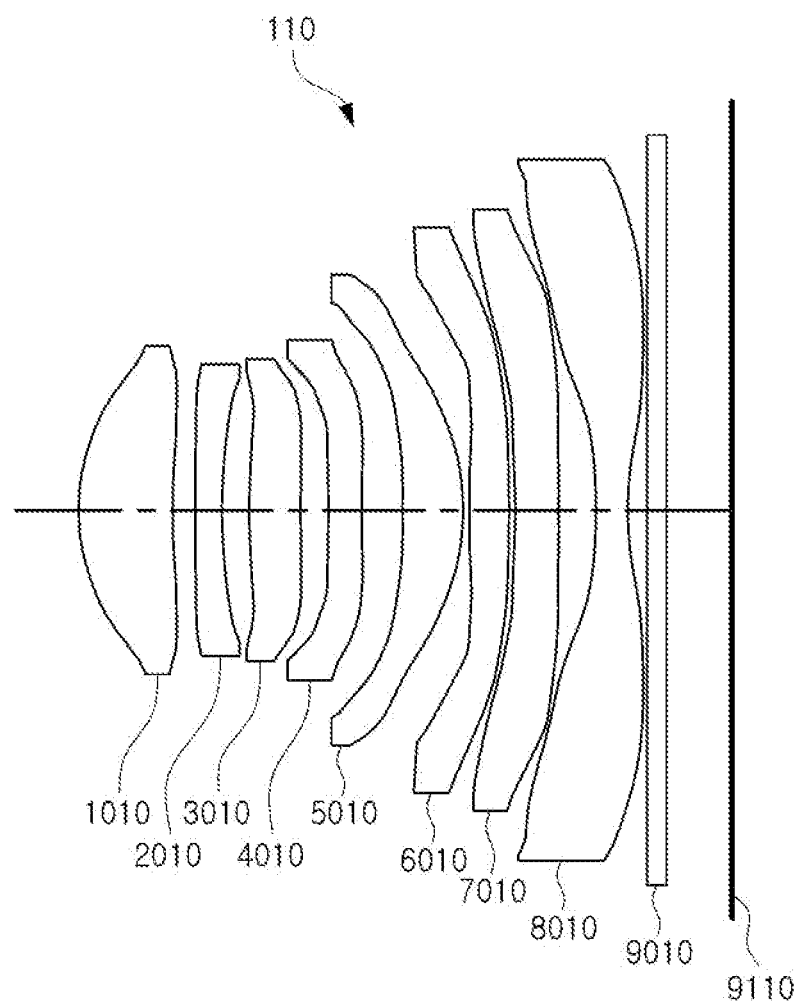
FIG. 19 is a view illustrating a tenth example of an optical imaging system.
Figure 20:
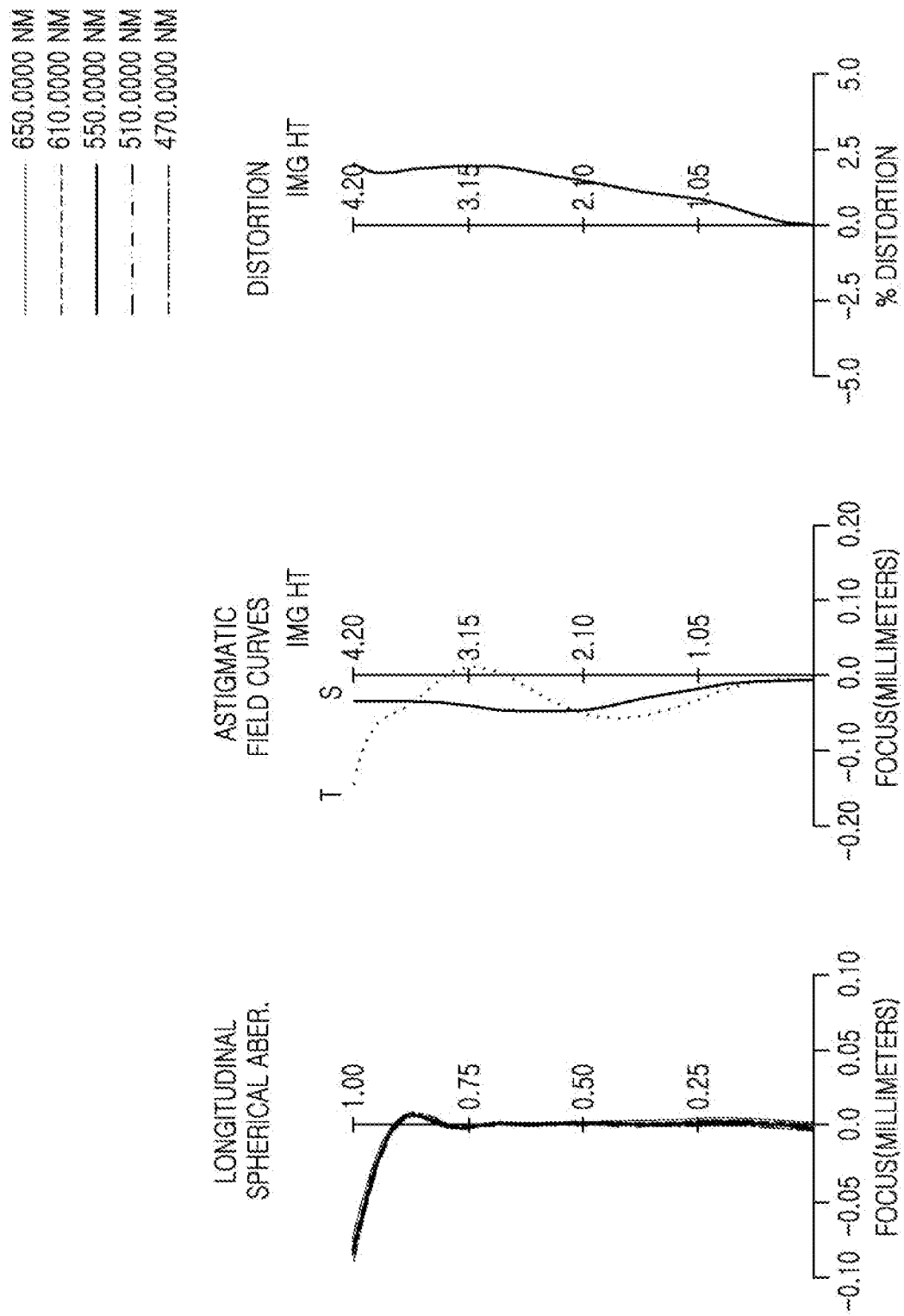
FIG. 20 illustrates aberration curves of the optical imaging system of FIG. 19.

FIG. 19 is a view illustrating a tenth example of an optical imaging system, and FIG. 20 illustrates aberration curves of the optical imaging system of FIG. 19.

6010 has a positive refractive power, a convex object-side surface, and a convex image-side surface. In addition, at least one inflection point is formed on either one or both of the object-side surface and the image-side surface of the sixth lens 6010. The seventh lens 7010 has a negative refractive power, a concave object-side surface, and a convex image-side surface. In addition, at least one inflection point is formed on either one or both of the object-side surface and the image-side surface of the seventh lens 7010. The eighth lens 8010 has a negative refractive power, a concave object-side surface, and a concave image-side surface. In addition, at least one inflection point is formed on either one or both of the object-side surface and the image-side surface of the eighth lens 8010.

The optical imaging system 110 further includes a stop, a filter 9010, and an image sensor 9110. The stop is disposed between the second lens 2010 and the third lens 3010 to adjust the amount of light incident on the image sensor 9110. The filter 9010 is disposed between the eighth lens 8010 and the image sensor 9110 to block infrared rays. The image sensor 9110 forms an imaging plane on which an image of a subject is formed. Although not illustrated in FIG. 19, the stop is disposed at a distance of 1.420 mm from the object-side surface of the first lens 1010 toward the imaging plane of the optical imaging system 110. This distance is equal to TTL-SL and can be calculated from the values of TTL and SL for Example 10 listed in Table 21 that appears later in this application.

Table 19 below shows physical properties of the lenses and other elements of the optical imaging system of FIG. 19, and Table 20 below shows aspherical surface coefficients of the lenses of FIG. 19. Both surfaces of all of the lenses of FIG. 19 are aspherical.

TABLE 19

| Surface No. | Element | Radius of Curvature | Thickness/ Distance | Index of Refraction | Abbe Number | Effective Aperture Radius | Focal Length |
|---|---|---|---|---|---|---|---|
| S1 | First | 2.310 | 0.934 | 1.546 | 56.110 | 1.710 | 5.110 |
| S2 | Lens | 11.502 | 0.222 | | | 1.690 | |
| S3 | Second | 17.984 | 0.264 | 1.677 | 19.240 | 1.525 | −10.418 |
| S4 (Stop) | Lens | 5.036 | 0.272 | | | 1.356 | |
| S5 | Third | 6.587 | 0.512 | 1.546 | 56.110 | 1.474 | 22.597 |
| S6 | Lens | 13.743 | 0.264 | | | 1.575 | |
| S7 | Fourth | 9.392 | 0.347 | 1.677 | 19.270 | 1.575 | −132.450 |
| S8 | Lens | 8.375 | 0.407 | | | 1.777 | |
| S9 | Fifth | −7.626 | 0.600 | 1.546 | 56.110 | 1.978 | 5.295 |
| S10 | Lens | −2.154 | 0.062 | | | 2.457 | |
| S11 | Sixth | 52.166 | 0.394 | 1.546 | 56.110 | 2.495 | 18.928 |
| S12 | Lens | −12.852 | 0.060 | | | 2.950 | |
| S13 | Seventh | −9.318 | 0.435 | 1.546 | 56.110 | 2.951 | −366.006 |
| S14 | Lens | −9.934 | 0.368 | | | 3.135 | |
| S15 | Eighth | −7.734 | 0.309 | 1.546 | 56.110 | 3.591 | −3.206 |
| S16 | Lens | 2.295 | 0.187 | | | 3.653 | |
| S17 | Filter | Infinity | 0.210 | 1.518 | 64.170 | 3.848 | |
| S18 | | Infinity | 0.640 | | | 3.909 | |
| S19 | Imaging Plane | Infinity | 0.010 | | | 4.257 | |

TABLE 20

| | K | A | B | C | D | E | F | G | H | J |
|---|---|---|---|---|---|---|---|---|---|---|
| S1 | −1.0644 | 0.0165 | 0.0018 | −0.0412 | 0.0886 | −0.0911 | 0.0530 | −0.0179 | 0.0033 | −0.0003 |
| S2 | 5.7701 | −0.0359 | 0.0936 | −0.1994 | 0.2566 | −0.2068 | 0.1044 | −0.0321 | 0.0055 | −0.0004 |
| S3 | −4.7434 | −0.0502 | 0.0968 | −0.2123 | 0.3323 | −0.3304 | 0.2072 | −0.0791 | 0.0168 | −0.0015 |
| S4 | −6.5690 | −0.0087 | −0.0558 | 0.2039 | −0.3571 | 0.3753 | −0.2421 | 0.0944 | −0.0204 | 0.0019 |
| S5 | −9.7869 | −0.0454 | 0.1549 | −0.4689 | 0.7798 | −0.8209 | 0.5452 | −0.2206 | 0.0496 | −0.0047 |
| S6 | −8.1203 | −0.0373 | 0.0197 | −0.0053 | 0.0310 | −0.0276 | 0.0169 | −0.0053 | 0.0007 | 0.0000 |
| S7 | 8.0509 | −0.1285 | 0.1427 | −0.3215 | 0.4824 | −0.4619 | 0.2746 | −0.0976 | 0.0190 | −0.0016 |
| S8 | −16.5055 | −0.1028 | 0.0934 | −0.1654 | 0.1981 | −0.1521 | 0.0746 | −0.0224 | 0.0037 | −0.0003 |
| S9 | −27.6061 | −0.0266 | 0.0611 | −0.0956 | 0.0729 | −0.0332 | 0.0098 | −0.0019 | 0.0002 | 0.0000 |
| S10 | −1.2761 | 0.0702 | −0.0651 | 0.0291 | −0.0095 | 0.0031 | −0.0008 | 0.0001 | 0.0000 | 0.0000 |
| S11 | −3.6589 | 0.0559 | −0.0802 | 0.0497 | −0.0205 | 0.0052 | −0.0008 | 0.0001 | 0.0000 | 0.0000 |
| S12 | 8.3323 | −0.0069 | 0.0109 | −0.0063 | 0.0016 | −0.0002 | 0.0000 | 0.0000 | 0.0000 | 0.0000 |
| S13 | −4.4601 | 0.0505 | −0.0475 | 0.0181 | −0.0037 | 0.0005 | 0.0000 | 0.0000 | 0.0000 | 0.0000 |
| S14 | −47.3000 | 0.1090 | −0.1069 | 0.0482 | −0.0122 | 0.0019 | −0.0002 | 0.0000 | 0.0000 | 0.0000 |
| S15 | −99.0000 | −0.0701 | −0.0085 | 0.0229 | −0.0086 | 0.0016 | −0.0002 | 0.0000 | 0.0000 | 0.0000 |
| S16 | −1.3322 | −0.1340 | 0.0521 | −0.0127 | 0.0020 | −0.0002 | 0.0000 | 0.0000 | 0.0000 | 0.0000 |

In Table 21 below, f is an overall focal length in mm of the optical imaging system, TTL is an overall length in mm of the optical imaging system (a distance from the object-side surface of the first lens to the imaging plane of the optical imaging system), SL is a distance in mm from the stop of the optical imaging system to the imaging plane, F No. is an f-number of the optical imaging system (the overall focal length f of the optical imaging system divided by the diameter of the entrance pupil of the optical imaging system, where both f and the diameter of the entrance pupil are expressed in mm), IMG HT is an image height in mm on the imaging plane (one-half of a diagonal length of the imaging plane), and FOV is a field of view in degrees of the optical imaging system.

Although Table 21 below shows specific values, in general, the overall focal length f of the optical imaging system may be within a range of 4.0 to 5.2 mm, the overall length TTL of the optical imaging system may be within a range of 5.0 to 6.5 mm, the field of view FOV of the optical imaging system may be 76 degrees or more, and the f-number F No. of the optical imaging system may be less than 2.0.

TABLE 21

| Example | f | TTL | SL | F No. | IMG HT | FOV |
|---|---|---|---|---|---|---|
| 1 | 4.388 | 5.470 | 4.610 | 1.900 | 3.728 | 79.310 |
| 2 | 4.525 | 5.500 | 4.656 | 1.967 | 3.728 | 77.980 |
| 3 | 4.547 | 5.500 | 4.645 | 1.894 | 3.728 | 77.990 |
| 4 | 4.464 | 5.462 | 4.590 | 1.786 | 3.728 | 78.380 |
| 5 | 4.493 | 5.493 | 4.599 | 1.769 | 3.728 | 77.980 |
| 6 | 4.433 | 5.488 | 4.572 | 1.679 | 3.728 | 78.732 |
| 7 | 4.309 | 5.407 | 4.4865 | 1.596 | 3.728 | 80.310 |
| 8 | 5.126 | 6.499 | 5.373 | 1.553 | 4.200 | 77.720 |
| 9 | 5.102 | 6.500 | 5.345 | 1.546 | 4.200 | 77.720 |
| 10 | 5.095 | 6.498 | 5.078 | 1.490 | 4.200 | 77.920 |

Table 22 below shows in mm a focal length f1 of the first lens, a focal length f2 of the second lens, a focal length f3 of the third lens, a focal length f4 of the fourth lens, a focal length f5 of the fifth lens, a focal length f6 of the sixth lens, a focal length f7 of the seventh lens, and a focal length f8 of the eighth lens for each of Examples 1-10 described herein.

Although Table 22 below shows specific values, in general, the focal length f1 of the first lens may be within a range of 3.5 to 6.0 mm, the focal length f2 of the second lens may be within a range of −12 to −8.0 mm, the focal length f3 of the third lens may be within a range of 20 to 32 mm, the focal length f5 of the fifth lens may be within a range of 3.0 to 6.0 mm, the focal length f6 of the sixth lens may be greater than or equal to 17 mm, and the focal length f8 of the eighth lens may be within a range of −4.0 to −2.0 mm.

TABLE 22

| Example | f1 | f2 | f3 | f4 | f5 | f6 | f7 | f8 |
|---|---|---|---|---|---|---|---|---|
| 1 | 4.215 | −10.176 | 29.645 | 192.851 | 3.554 | 111.853 | −150.465 | −2.717 |
| 2 | 4.081 | −9.162 | 23.634 | 152.337 | 3.736 | 80.744 | −80.158 | −2.642 |
| 3 | 4.023 | −9.031 | 24.326 | 3233.009 | 3.815 | 895.716 | −281.821 | −2.706 |
| 4 | 4.017 | −9.189 | 26.665 | −852.360 | 3.794 | 593.968 | 151.765 | −2.727 |
| 5 | 4.034 | −9.156 | 27.439 | 318.073 | 3.965 | 69.598 | 191.678 | −2.637 |
| 6 | 4.094 | −9.049 | 23.523 | −321.626 | 4.061 | 24.608 | 580.584 | −2.583 |
| 7 | 4.157 | −9.158 | 21.620 | −115.317 | 4.041 | 21.050 | 167.740 | −2.597 |
| 8 | 5.127 | −10.792 | 23.325 | −127.525 | 5.311 | 18.597 | −178.940 | −3.200 |
| 9 | 5.112 | −10.447 | 22.808 | −164.761 | 5.324 | 19.446 | −329.440 | −3.216 |
| 10 | 5.110 | −10.418 | 22.597 | −132.450 | 5.295 | 18.928 | −366.006 | −3.206 |

Table 23 shows in mm a thickness (L1edgeT) of an edge portion (rib) of the first lens, a thickness (L2edgeT) of an edge portion (rib) of the second lens, a thickness (L3edgeT) of an edge portion (rib) of the third lens, a thickness (L4edgeT) of an edge portion (rib) of the fourth lens, a thickness (L5edgeT) of an edge portion (rib) of the fifth lens, a thickness (L6edgeT) of an edge portion (rib) of the sixth lens, a thickness (L7edgeT) of an edge portion (rib) of the seventh lens, and a thickness (L8edgeT) of an edge portion (rib) of the eighth lens for each of Examples 1-10 described herein.

TABLE 23

| Example | L1edgeT | L2edgeT | L3edgeT | L4edgeT | L5edgeT | L6edgeT | L7edgeT | L8edgeT |
|---|---|---|---|---|---|---|---|---|
| 1 | 0.337 | 0.34 | 0.265 | 0.316 | 0.36 | 0.568 | 0.184 | 0.456 |
| 2 | 0.302 | 0.344 | 0.307 | 0.302 | 0.364 | 0.527 | 0.254 | 0.374 |
| 3 | 0.261 | 0.355 | 0.296 | 0.312 | 0.310 | 0.480 | 0.231 | 0.460 |
| 4 | 0.247 | 0.361 | 0.291 | 0.311 | 0.283 | 0.463 | 0.248 | 0.456 |
| 5 | 0.254 | 0.346 | 0.324 | 0.312 | 0.297 | 0.496 | 0.272 | 0.398 |
| 6 | 0.244 | 0.341 | 0.286 | 0.322 | 0.290 | 0.455 | 0.297 | 0.423 |
| 7 | 0.252 | 0.330 | 0.240 | 0.309 | 0.255 | 0.406 | 0.259 | 0.509 |
| 8 | 0.292 | 0.411 | 0.305 | 0.405 | 0.272 | 0.381 | 0.345 | 0.797 |
| 9 | 0.300 | 0.418 | 0.315 | 0.405 | 0.281 | 0.421 | 0.344 | 0.741 |
| 10 | 0.245 | 0.389 | 0.322 | 0.395 | 0.277 | 0.404 | 0.331 | 0.776 |

Table 24 below shows in mm a sag (L5S1 sag) of the object-side surface of the fifth lens, a sag (L5S2 sag) of the image-side surface of the fifth lens, a thickness (Yc82T) of the eighth lens at an inflection point on the image-side surface of the eighth lens, and a composite focal length (f345) of the third to fifth lenses for each of Examples 1-10 described herein.

TABLE 24

| Example | L5S1 sag | L5S2 sag | Yc82T | f345 |
|---|---|---|---|---|
| 1 | 0.375 | 0.790 | 0.590 | 3.389 |
| 2 | 0.410 | 0.770 | 0.590 | 3.457 |
| 3 | 0.438 | 0.756 | 0.705 | 3.563 |
| 4 | 0.432 | 0.741 | 0.725 | 3.588 |
| 5 | 0.417 | 0.722 | 0.680 | 3.697 |
| 6 | 0.416 | 0.734 | 0.690 | 3.774 |
| 7 | 0.389 | 0.708 | 0.720 | 3.771 |
| 8 | 0.482 | 0.801 | 0.870 | 4.842 |
| 9 | 0.486 | 0.804 | 0.850 | 4.807 |
| 10 | 0.483 | 0.806 | 0.860 | 0.480 |

Table 25 below shows in mm an inner diameter of each of the first to eighth spacers for each of Examples 1-10 described herein. S1d is an inner diameter of the first spacer SP1, S2d is an inner diameter of the second spacer SP2, S3d is an inner diameter of the third spacer SP3, S4d is an inner diameter of the fourth spacer SP4, S5d is an inner diameter of the fifth spacer SP5, S6d is an inner diameter of the sixth spacer SP6, S7d is an inner diameter of the seventh spacer SP7, and S8d is an inner diameter of the eighth spacer SP8.

TABLE 25

| Example | S1d | S2d | S3d | S4d | S5d | S6d | S7d | S8d |
|---|---|---|---|---|---|---|---|---|
| 1 | 2.320 | 2.220 | 2.480 | 2.890 | 3.95 | 5.14 | 6.06 | 5.73 |
| 2 | 2.120 | 2.130 | 2.420 | 2.970 | 3.870 | 4.890 | 5.65 | — |
| 3 | 2.240 | 2.190 | 2.520 | 2.960 | 3.850 | 4.890 | 5.54 | — |
| 4 | 2.340 | 2.290 | 2.470 | 2.980 | 3.770 | 4.830 | 5.53 | — |
| 5 | 2.370 | 2.210 | 2.470 | 2.850 | 3.730 | 4.920 | 5.52 | — |
| 6 | 2.470 | 2.250 | 2.500 | 3.040 | 4.040 | 5.020 | 5.62 | — |
| 7 | 2.530 | 2.310 | 2.460 | 2.990 | 3.820 | 4.770 | 5.57 | — |
| 8 | 3.060 | 2.810 | 3.100 | 3.690 | 4.710 | 5.790 | 6.73 | — |
| 9 | 3.060 | 2.820 | 3.100 | 3.590 | 4.800 | 5.790 | 6.49 | — |
| 10 | 3.160 | 2.740 | 3.050 | 3.710 | 4.730 | 5.710 | 6.61 | — |

Table 26 below shows in $mm^3$ a volume of each of the first to eighth lenses for each of Examples 1-10 described herein. L1v is a volume of the first lens, L2v is a volume of the second lens, L3v is a volume of the third lens, L4v is a volume of the fourth lens, L5v is a volume of the fifth lens, L6v is a volume of the sixth lens, L7v is a volume of the seventh lens, and L8v is a volume of the eighth lens.

TABLE 26

| Example | L1v | L2v | L3v | L4v | L5v | L6v | L7v | L8v |
|---|---|---|---|---|---|---|---|---|
| 1 | 5.309 | 5.248 | 4.706 | 4.806 | 12.7176 | 19.649 | 12.3864 | 23.5598 |
| 2 | 5.242 | 5.046 | 5.230 | 5.000 | 11.834 | 16.696 | 15.5578 | 22.7144 |
| 3 | 4.121 | 5.477 | 5.312 | 4.927 | 10.642 | 16.198 | 14.6022 | 26.0867 |
| 4 | 5.370 | 5.618 | 5.289 | 5.280 | 9.594 | 15.225 | 14.7372 | 26.9185 |
| 5 | 5.780 | 5.525 | 5.822 | 5.264 | 10.666 | 16.152 | 13.4873 | 23.4133 |
| 6 | 6.115 | 5.784 | 5.502 | 5.663 | 10.456 | 14.883 | 14.1524 | 24.6726 |
| 7 | 6.423 | 5.947 | 4.893 | 5.764 | 9.669 | 13.574 | 13.8487 | 26.3663 |
| 8 | 11.794 | 10.320 | 9.814 | 11.957 | 16.126 | 21.281 | 24.3849 | 47.3755 |
| 9 | 12.038 | 10.577 | 9.885 | 12.412 | 14.015 | 22.120 | 24.5267 | 45.7414 |
| 10 | 11.661 | 11.228 | 10.288 | 13.932 | 13.896 | 21.775 | 24.38 | 46.5654 |

Table 27 below shows in mg a weight of each of the first to eighth lenses for each of Examples 1-10 described herein. L1w is a weight of the first lens, L2w is a weight of the second lens, L3w is a weight of the third lens, L4w is a weight of the fourth lens, L5w is a weight of the fifth lens, Low is a weight of the sixth lens, L7w is a weight of the seventh lens, and L8w is a weight of the eighth lens.

TABLE 27

| Example | L1w | L2w | L3w | L4w | L5w | L6w | L7w | L8w |
|---|---|---|---|---|---|---|---|---|
| 1 | 5.522 | 6.559 | 4.894 | 6.008 | 13.226 | 20.435 | 12.882 | 24.502 |
| 2 | 5.452 | 6.307 | 5.439 | 6.250 | 12.308 | 17.364 | 16.180 | 23.623 |
| 3 | 4.285 | 6.846 | 5.525 | 6.159 | 11.067 | 16.846 | 15.186 | 27.130 |
| 4 | 5.585 | 7.023 | 5.501 | 6.599 | 9.978 | 15.834 | 15.327 | 27.995 |
| 5 | 6.012 | 6.906 | 6.055 | 6.580 | 11.093 | 16.798 | 14.027 | 24.350 |
| 6 | 6.360 | 7.230 | 5.722 | 7.079 | 10.874 | 15.478 | 14.718 | 25.660 |
| 7 | 6.680 | 7.434 | 5.088 | 7.205 | 10.056 | 14.116 | 14.403 | 27.421 |
| 8 | 12.265 | 12.899 | 10.206 | 14.946 | 16.771 | 22.132 | 25.360 | 49.271 |
| 9 | 12.519 | 13.222 | 10.280 | 15.514 | 14.576 | 23.005 | 25.508 | 47.571 |
| 10 | 12.128 | 14.035 | 10.700 | 17.416 | 14.452 | 22.646 | 25.355 | 48.428 |

Table 28 below shows in mm an overall outer diameter (including a rib) of each of the first to eighth lenses for each of Examples 1-10 described herein. L1TD is an overall outer diameter of the first lens, L2TD is an overall outer diameter of the second lens, L3TD is an overall outer diameter of the third lens, L4TD is an overall outer diameter of the fourth lens, L5TD is an overall outer diameter of the fifth lens, L6TD is an overall outer diameter of the sixth lens, L7TD is an overall outer diameter of the seventh lens, and L8TD is an overall outer diameter of the eighth lens.

TABLE 28

| Example | L1TD | L2TD | L3TD | L4TD | L5TD | L6TD | L7TD | L8TD |
|---|---|---|---|---|---|---|---|---|
| 1 | 4.120 | 4.210 | 4.340 | 4.520 | 5.700 | 6.610 | 7.100 | 7.380 |
| 2 | 4.040 | 4.130 | 4.270 | 4.440 | 5.620 | 6.530 | 7.020 | 7.300 |
| 3 | 4.140 | 4.230 | 4.370 | 4.540 | 5.720 | 6.630 | 6.990 | 7.280 |
| 4 | 4.240 | 4.330 | 4.470 | 4.640 | 5.820 | 6.470 | 6.960 | 7.240 |
| 5 | 4.280 | 4.370 | 4.510 | 4.680 | 5.720 | 6.370 | 6.860 | 7.140 |
| 6 | 4.380 | 4.470 | 4.610 | 4.780 | 5.820 | 6.450 | 6.930 | 7.220 |
| 7 | 4.440 | 4.530 | 4.670 | 4.840 | 5.880 | 6.400 | 6.890 | 7.170 |
| 8 | 5.470 | 5.560 | 5.690 | 5.870 | 7.030 | 7.550 | 8.050 | 8.330 |
| 9 | 5.470 | 5.560 | 5.860 | 6.040 | 6.490 | 7.550 | 8.050 | 8.350 |
| 10 | 5.590 | 5.680 | 5.980 | 6.160 | 6.610 | 7.670 | 8.030 | 8.330 |

Table 29 below shows in mm a thickness of a flat portion of the rib of each of the first to eighth lenses for each of Examples 1-10 described herein. L1rt is a thickness of a flat portion of the rib of the first lens, L2rt is a thickness of a flat portion of the rib of the second lens, L3rt is a thickness of a flat portion of the rib of the third lens, L4rt is a thickness of a flat portion of the rib of the fourth lens, L5rt is a thickness of a flat portion of the rib of the fifth lens, L6rt is a thickness of a flat portion of the rib of the sixth lens, L7rt is a thickness of a flat portion of the rib of the seventh lens, and L8rt is a thickness of a flat portion of the rib of the eighth lens.

TABLE 29

| Example | L1rt | L2rt | L3rt | L4rt | L5rt | L6rt | L7rt | L8rt |
|---|---|---|---|---|---|---|---|---|
| 1 | 0.440 | 0.460 | 0.350 | 0.250 | 0.470 | 0.720 | 0.220 | 0.470 |
| 2 | 0.470 | 0.460 | 0.410 | 0.310 | 0.450 | 0.590 | 0.380 | 0.470 |
| 3 | 0.430 | 0.480 | 0.400 | 0.280 | 0.410 | 0.550 | 0.390 | 0.510 |
| 4 | 0.430 | 0.470 | 0.370 | 0.290 | 0.360 | 0.540 | 0.400 | 0.570 |
| 5 | 0.460 | 0.460 | 0.400 | 0.250 | 0.430 | 0.630 | 0.350 | 0.460 |
| 6 | 0.460 | 0.460 | 0.370 | 0.290 | 0.430 | 0.570 | 0.370 | 0.460 |
| 7 | 0.460 | 0.460 | 0.330 | 0.290 | 0.390 | 0.530 | 0.390 | 0.580 |
| 8 | 0.570 | 0.440 | 0.440 | 0.430 | 0.530 | 0.640 | 0.500 | 0.880 |
| 9 | 0.590 | 0.530 | 0.410 | 0.520 | 0.460 | 0.630 | 0.500 | 0.820 |
| 10 | 0.540 | 0.540 | 0.420 | 0.580 | 0.430 | 0.590 | 0.520 | 0.860 |

Table 30 below shows numerical values of Conditional Expressions 1-5 for each of Examples 1-10 described herein.

TABLE 30

| Example | L1w/L8w | S7d/f | L1TD/L8TD | L1234TDavg/L8TD | L12345TDavg/L8TD |
|---|---|---|---|---|---|
| 1 | 0.22537 | 1.38041 | 0.55827 | 0.58232 | 0.62033 |
| 2 | 0.23079 | 1.24724 | 0.55342 | 0.57808 | 0.61644 |
| 3 | 0.15794 | 1.21758 | 0.56868 | 0.59341 | 0.63187 |
| 4 | 0.19950 | 1.23991 | 0.58564 | 0.61050 | 0.64917 |
| 5 | 0.24690 | 1.22940 | 0.59944 | 0.62465 | 0.65994 |
| 6 | 0.24786 | 1.26862 | 0.60665 | 0.63158 | 0.66648 |
| 7 | 0.24361 | 1.29234 | 0.61925 | 0.64435 | 0.67950 |
| 8 | 0.24893 | 1.31189 | 0.65666 | 0.67797 | 0.71116 |
| 9 | 0.26316 | 1.27255 | 0.65509 | 0.68653 | 0.70467 |
| 10 | 0.25043 | 1.29608 | 0.67107 | 0.70258 | 0.72077 |

Table 31 below shows numerical values of Conditional Expressions 6-10 for each of Examples 1-10 described herein.

TABLE 31

| Example | (V2 + V4)/2 | (V5 + V6 + V7 + V8)/4 | Nd2 | Nd4 | Nd6 |
|---|---|---|---|---|---|
| 1 | 19.26 | 56.11 | 1.677 | 1.677 | 1.546 |
| 2 | 19.26 | 56.11 | 1.677 | 1.677 | 1.546 |
| 3 | 19.26 | 56.11 | 1.677 | 1.677 | 1.546 |
| 4 | 19.26 | 56.11 | 1.677 | 1.677 | 1.546 |
| 5 | 19.26 | 56.11 | 1.677 | 1.677 | 1.546 |
| 6 | 19.26 | 56.11 | 1.677 | 1.677 | 1.546 |
| 7 | 19.26 | 56.11 | 1.677 | 1.677 | 1.546 |
| 8 | 19.26 | 56.11 | 1.677 | 1.677 | 1.546 |
| 9 | 19.26 | 56.11 | 1.677 | 1.677 | 1.546 |
| 10 | 19.26 | 56.11 | 1.677 | 1.677 | 1.546 |

Table 32 below shows numerical values of Conditional Expressions 11-15 for each of Examples 1-10 described herein.

TABLE 32

| Example | f1/f5 | f3/f2 | f5/f8 | f5/f | TTL/f1 |
|---|---|---|---|---|---|
| 1 | 1.1865 | −2.9133 | −1.3077 | 0.8092 | 1.2981 |
| 2 | 1.0924 | −2.5795 | −1.4139 | 0.8245 | 1.3482 |
| 3 | 1.0539 | −2.6937 | −1.4096 | 0.8386 | 1.3676 |
| 4 | 1.0590 | −2.9015 | −1.3915 | 0.8505 | 1.3600 |
| 5 | 1.0171 | −2.9967 | −1.5037 | 0.8833 | 1.3623 |
| 6 | 1.0079 | −2.5998 | −1.5722 | 0.9164 | 1.3409 |
| 7 | 1.0288 | −2.3604 | −1.5558 | 0.9376 | 1.3005 |
| 8 | 0.9654 | −2.1612 | −1.6595 | 1.0353 | 1.2677 |
| 9 | 0.9603 | −2.1836 | −1.6554 | 1.0435 | 1.2720 |
| 10 | 0.9655 | −2.1692 | −1.6515 | 1.0378 | 1.2713 |

Table 33 below shows numerical values of Conditional Expressions 16-20 for each of Examples 1-10 described herein.

TABLE 33

| Example | TTL/f5 | R7/R8 | R13/R14 | R16/R1 | (R2 − R15)/(R1 + R16) |
|---|---|---|---|---|---|
| 1 | 1.5401 | 0.9822 | 0.8856 | 1.0748 | 3.6838 |
| 2 | 1.4728 | 0.9615 | 0.8230 | 1.1180 | 3.4837 |
| 3 | 1.4414 | 1.0139 | 0.9324 | 1.1743 | 3.4856 |
| 4 | 1.4403 | 1.0280 | 1.0857 | 1.1266 | 3.7888 |
| 5 | 1.3856 | 0.9859 | 1.0622 | 1.0757 | 3.9072 |
| 6 | 1.3516 | 1.0491 | 1.0044 | 1.0378 | 3.9170 |
| 7 | 1.3380 | 1.1103 | 1.0672 | 0.9931 | 4.1329 |
| 8 | 1.2238 | 1.1266 | 0.8956 | 0.9912 | 4.1606 |

TABLE 33-continued

| Example | TTL/f5 | R7/R8 | R13/R14 | R16/R1 | (R2 − R15)/(R1 + R16) |
|---|---|---|---|---|---|
| 9 | 1.2216 | 1.1003 | 0.9333 | 0.9928 | 4.2075 |
| 10 | 1.2275 | 1.1214 | 0.9380 | 0.9935 | 4.1778 |

Table 34 below shows numerical values of Conditional Expressions 22-24 for each of Examples 1-10 described herein.

TABLE 34

| Example | R15/R16 | (R7*R9)/(R8*R10) | (R7*R10)/(R8*R9) |
|---|---|---|---|
| 1 | −3.469 | 4.4728 | 0.2157 |
| 2 | −2.726 | 3.7469 | 0.2467 |
| 3 | −2.534 | 3.9620 | 0.2595 |
| 4 | −2.986 | 3.8608 | 0.2737 |
| 5 | −2.916 | 3.5229 | 0.2759 |
| 6 | −2.934 | 3.7694 | 0.2920 |
| 7 | −3.407 | 4.0425 | 0.3050 |
| 8 | −3.370 | 3.9489 | 0.3214 |
| 9 | −3.410 | 3.8478 | 0.3146 |
| 10 | −3.370 | 3.9703 | 0.3168 |

Figure 21:
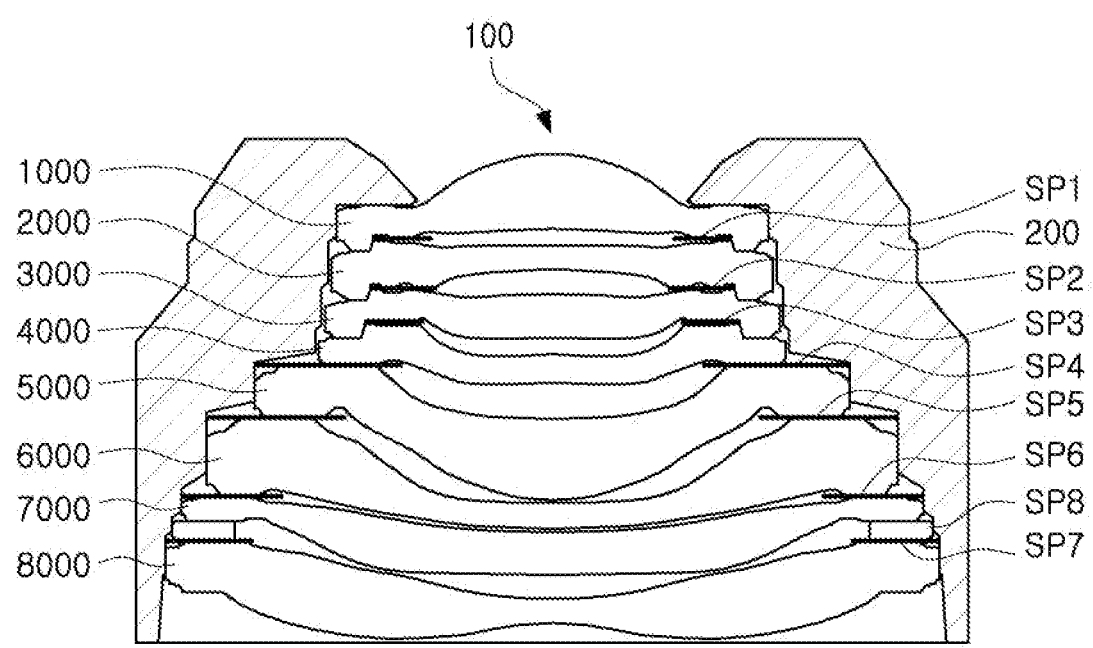
FIG. 21 and FIG. 22 are cross-sectional views of an optical imaging system coupled to a lens barrel.
Figure 22:
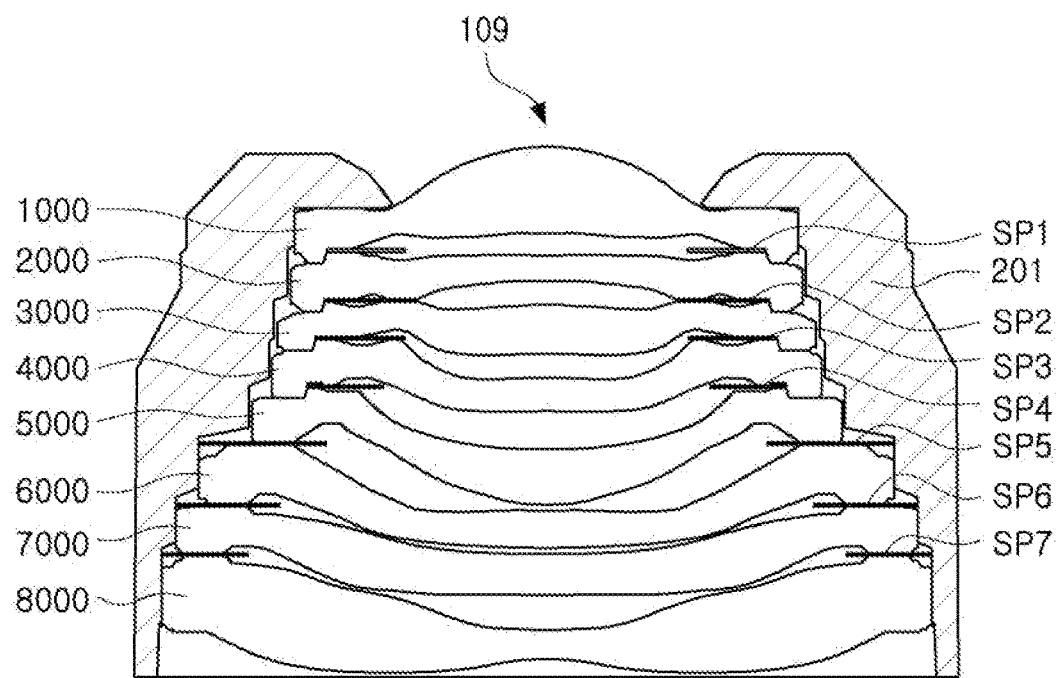

FIG. 21 and FIG. 22 are cross-sectional views of an optical imaging system coupled to a lens barrel.

The examples of the optical imaging system described in this application may include a self-alignment structure as illustrated in FIGS. 21 and 22.

In one example illustrated in FIG. 21, an optical imaging system 100 includes a self-alignment structure in which optical axes of four consecutive lenses 1000, 2000, 3000, and 4000 are aligned with an optical axis of the optical imaging system 100 by coupling the four lenses 1000, 2000, 3000, and 4000 to one another. The optical imaging system 100 includes a first lens 1000, a second lens 2000, a third lens 3000, a fourth lens 4000, a fifth lens 5000, a sixth lens 6000, a seventh lens 7000, and an eighth lens 8000 disposed in a lens barrel 200 in numerical order along an optical axis of the optical imaging system 100 from an object side of the optical imaging system 100 toward an imaging plane of the optical imaging system 100. The optical imaging system 100 further includes a first spacer SP1 disposed between the first lens 1000 and the second lens 2000, a second spacer SP2 disposed between the second lens 2000 and the third lens 3000, a third spacer SP3 disposed between the third lens 3000 and the fourth lens 4000, a fourth spacer SP4 disposed between the fourth lens 4000 and the fifth lens 5000, a fifth spacer SP5 disposed between the fifth lens 5000 and the sixth lens 6000, a sixth spacer SP6 disposed between the sixth lens 6000 and the seventh lens 7000, a seventh spacer SP7 disposed between the seventh lens 7000 and the eighth lens 8000, and an eighth spacer SP8 disposed between the seventh lens 7000 and the seventh spacer SP7.

The first lens 1000 disposed closest to the object side of the optical imaging system 100 is disposed in contact with an inner surface of the lens barrel 200 to align the optical axis of the first lens 1000 with the optical axis of the optical imaging system 100, the second lens 2000 is coupled to the first lens 1000 to align the optical axis of the second lens 2000 with the optical axis of the optical imaging system 100, the third lens 3000 is coupled to the second lens 2000 to align the optical axis of the third lens 3000 with the optical axis of the optical imaging system 100, and the fourth lens 4000 is coupled to the third lens 3000 to align the optical axis of the fourth lens 4000 with the optical axis of the optical imaging system 100. The second lens 2000 to the fourth lens 4000 may not be in contact with the inner surface of the lens barrel 200, but the fifth lens 5000 to the eighth lens 8000 may be in contact with the inner surface of the lens barrel 200 to align the optical axes of the fifth lens 5000 to the eighth lens 8000 with the optical axis of the optical imaging system 100.

Although FIG. 21 illustrates that the first lens 1000 to the fourth lens 4000 are coupled to one another, the four consecutive lenses that are coupled to one another may be changed to the second lens 2000 to the fifth lens 5000, or the third lens 3000 to the sixth lens 6000, or the fourth lens 4000 to the seventh lens 7000, or the fifth lens 5000 to the eighth lens 8000.

In another example illustrated in FIG. 22, an optical imaging system 109 includes a self-alignment structure in which optical axes of five consecutive lenses 1000, 2000, 3000, 4000, and 5000 are aligned with an optical axis of the optical imaging system 109 by coupling the five lenses 1000, 2000, 3000, 4000, and 5000 to one another. The optical imaging system 109 includes a first lens 1000, a second lens 2000, a third lens 3000, a fourth lens 4000, a fifth lens 5000, a sixth lens 6000, a seventh lens 7000, and an eighth lens 8000 disposed in a lens barrel 201 in numerical order along an optical axis of the optical imaging system 109 from an object side of the optical imaging system 109 toward an imaging plane of the optical imaging system 100. The optical imaging system 109 further includes a first spacer SP1 disposed between the first lens 1000 and the second lens 2000, a second spacer SP2 disposed between the second lens 2000 and the third lens 3000, a third spacer SP3 disposed between the third lens 3000 and the fourth lens 4000, a fourth spacer SP4 disposed between the fourth lens 4000 and the fifth lens 5000, a fifth spacer SP5 disposed between the fifth lens 5000 and the sixth lens 6000, a sixth spacer SP6 disposed between the sixth lens 6000 and the seventh lens 7000, and a seventh spacer SP7 disposed between the seventh lens 7000 and the eighth lens 8000. The optical imaging system 109 does not include an eighth spacer disposed between the seventh lens 7000 and the seventh spacer SP7 like the eighth spacer SP8 of the optical imaging system 100 illustrated in FIG. 21.

The first lens 1000 disposed closest to the object side of the optical imaging system 109 is disposed in contact with the inner surface of the lens barrel 201 to align the optical axis of the first lens 1000 with the optical axis of the optical imaging system 109, the second lens 2000 is coupled to the first lens 1000 to align the optical axis of the second lens 2000 with the optical axis of the optical imaging system 109, the third lens 3000 is coupled to the second lens 2000 to align the optical axis of the third lens 3000 with the optical axis of the optical imaging system 109, the fourth lens 4000 is coupled to the third lens 3000 to align the optical axis of the fourth lens 4000 with the optical axis of the optical imaging system 109, and the fifth lens 5000 is coupled to the fourth lens 4000 to align the optical axis of the fifth lens 5000 with the optical axis of the optical imaging system 109. The second lens 2000 to the fifth lens 5000 may not be in contact with the inner surface of the lens barrel 201, but the sixth lens 6000 to the eighth lens 8000 may be in contact with the inner surface of the lens barrel 201 to align the optical axes of the sixth lens 6000 to the eighth lens 8000 with the optical axis of the optical imaging system 109.

Although FIG. 22 illustrates that the first lens 1000 to the fifth lens 5000 are coupled to one another, the five consecutive lenses that are coupled to one another may be changed to the second lens 2000 to the sixth lens 6000, or the third lens 3000 to the seventh lens 7000, or the fourth lens 4000 to the eighth lens 8000.

Figure 23:
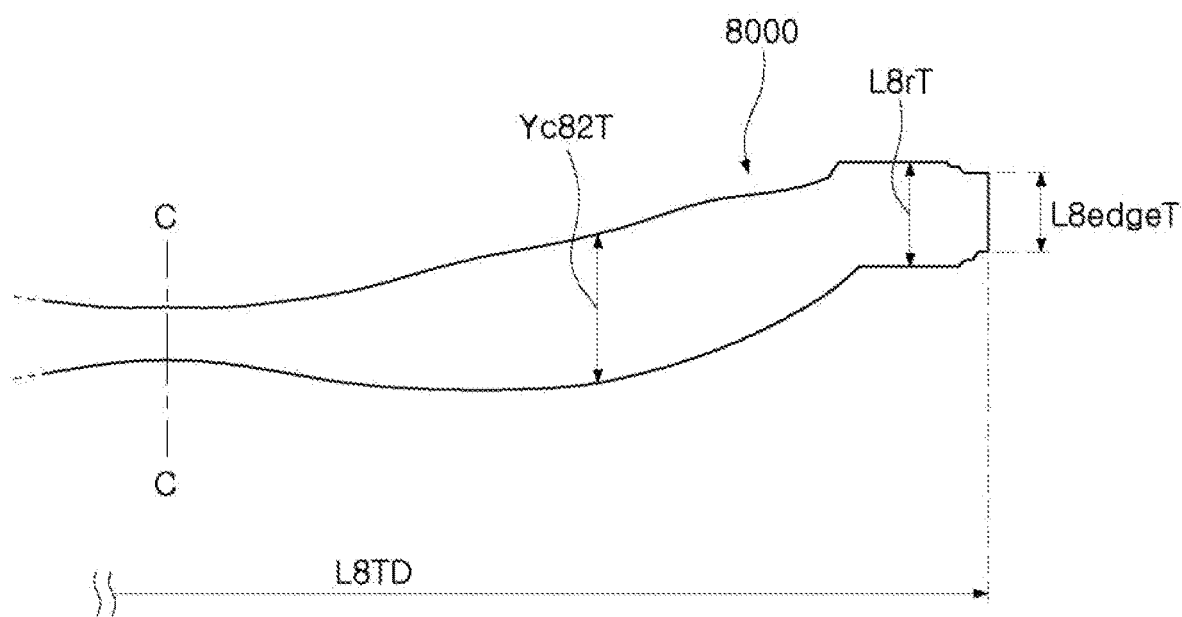
FIG. 23 is a cross-sectional view illustrating an example of an eighth lens.

FIG. 23 is a cross-sectional view illustrating an example of an eighth lens.

FIG. 23 illustrates the overall outer diameter (L8TD) of an eighth lens 8000, the thickness (L8rt) of the flat portion of the rib of the eighth lens 8000, the thickness (L8edgeT) of the edge of the rib of the eighth lens 8000, and the thickness (Yc82T) of the eighth lens at an inflection point on the image-side surface of the eighth lens 8000. Although FIG. 23 illustrates the eighth lens 8000, the overall outer diameter, the thickness of the flat portion of the rib, and the thickness of the edge of the rib of each of the first to seventh lenses are defined in the same way.

Figure 24:
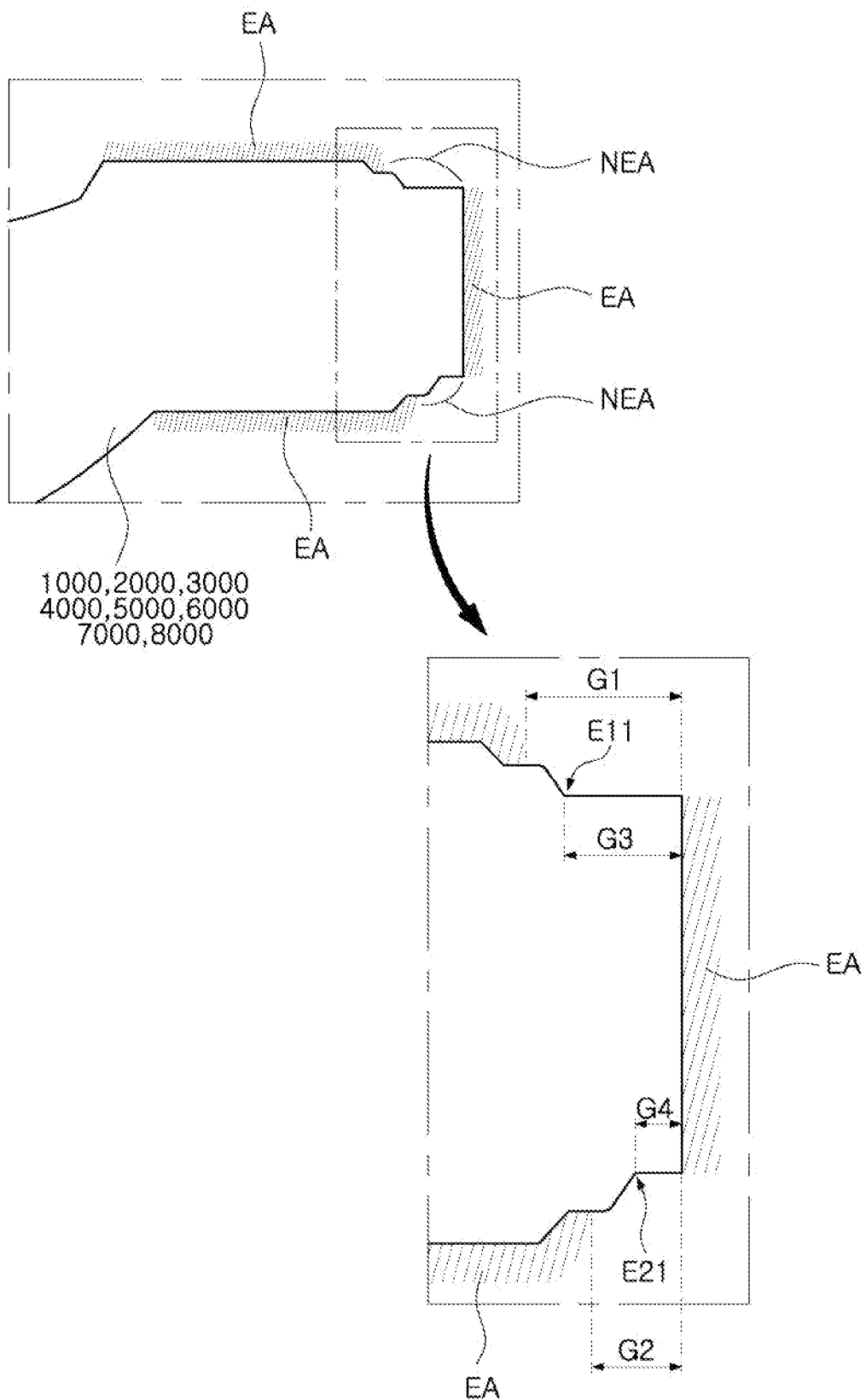
FIG. 24 is a cross-sectional view illustrating an example of a shape of a rib of a lens.

FIG. 24 is a cross-sectional view illustrating an example of a shape of a rib of a lens.

The examples of the optical imaging system described in this application may include a structure for preventing a flare phenomenon and reflection.

For example, the ribs of the first to eighth lenses 1000, 2000, 3000, 4000, 5000, 6000, 7000, and 8000 of the optical imaging system may be partially surface-treated to make the surface of the rib rough as illustrated in FIG. 24. Methods of surface treatment may include chemical etching, physical grinding, or any other surface treatment method capable of increasing a roughness of a surface.

A surface-treated area EA may be formed in an entire area from an edge of the optical portion of the lens through which light actually passes to an outer end of the rib. However, as illustrated in FIG. 24, non-treated areas NEA including step portions E11 and E21 may not be surface-treated, or may be surface-treated to have a roughness less than a roughness of the surface-treated area EA. The step portions E11 and E21 are portions where the thickness of the rib abruptly changes. A width G1 of a first non-treated area NEA formed on an object-side surface of the lens and including a first step portion E11 may be different from a width G2 of a second non-treated area NEA formed on an image-side surface of the lens and including a second step portion E21. In the example illustrated in FIG. 24, G1 is greater than G2.

The width G1 of the first non-treated area NEA includes the first step portion E11 and the second step portion E21 when viewed in an optical axis direction, and the width G2 of the second non-treated area NEA includes the second step portion E21 but not the first step portion E11 when viewed in the optical axis direction. A distance G4 from the outer end of the rib to the second step portion E21 is smaller than a distance G3 from the outer end of the rib to the first step portion E11.

The positions at which the non-treated areas NEA and the step portions E11 and E21 are formed as described above may be advantageous for measuring a concentricity of the lens by using test equipment. For example, for a lens having the above-described shape, since the first step portion E11 and the second step portion E21 can be recognized by test equipment, the optical axes of the lenses can be accurately aligned by detecting the concentricity of the lenses.

The examples described above enable the optical imaging system to be miniaturized and aberrations to be easily corrected.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a first lens having a refractive power;
   a second lens having negative refractive power;
   a third lens having a refractive power;
   a fourth lens having a refractive power;
   a fifth lens having a refractive power;
   a sixth lens having a refractive power;
   a seventh lens having a refractive power; and
   an eighth lens having a refractive power,
   wherein the optical imaging system includes a total of eight lenses with refractive power and the first to eighth lenses are sequentially disposed in numerical order along an optical axis of the optical imaging system from an object side of the optical imaging system toward an imaging plane of the optical imaging system,
   wherein a radius of curvature of an object-side surface of the third lens is greater than a radius of curvature of an image-side surface of the second lens,
   wherein a radius of curvature of an image-side surface of the fourth lens is greater than a radius of curvature of an image-side surface of the fifth lens,
   wherein $2.0<|R15/R16|<5.0$, where R15 is a radius of curvature of an object-side surface of the eighth lens and R16 is a radius of curvature of an image-side surface of the eighth lens, and
   wherein $LT4<LT5$, where LT4 is a thickness of the fourth lens along the optical axis and LT5 is a thickness of the fifth lens along the optical axis.

2. The optical imaging system of claim 1, wherein the first lens has a convex object-side surface.

3. The optical imaging system of claim 1, wherein the second lens has a convex object-side surface.

4. The optical imaging system of claim 1, wherein the third lens has a convex object-side surface.

5. The optical imaging system of claim 1, wherein the fourth lens has a convex object-side surface.

6. The optical imaging system of claim 1, wherein the sixth lens has a concave object-side surface.

7. The optical imaging system of claim 1, wherein the eighth lens has a concave object-side surface.

8. An optical imaging system, comprising:
   a first lens having a refractive power;
   a second lens having a refractive power;
   a third lens having a refractive power;
   a fourth lens having a refractive power;
   a fifth lens having positive refractive power;
   a sixth lens having a refractive power;
   a seventh lens having a refractive power; and
   an eighth lens having a refractive power and a concave object-side surface,
   wherein the optical imaging system includes a total of eight lenses with refractive power and the first to eighth lenses are sequentially disposed in numerical order along an optical axis of the optical imaging system from an object side of the optical imaging system toward an imaging plane of the optical imaging system, wherein a radius of curvature of an object-side surface of the third lens is greater than a radius of curvature of an image-side surface of the second lens, wherein a radius of curvature of an image-side surface of the fourth lens is greater than a radius of curvature of an image-side surface of the fifth lens, wherein $2.0<|R15/R16|<5.0$, where R15 is a radius of curvature of an object-side surface of the eighth lens and R16 is a radius of curvature of an image-side surface of the eighth lens, and wherein LT4<LT5, where LT4 is a thickness of the fourth lens along the optical axis and LT5 is a thickness of the fifth lens along the optical axis.

9. The optical imaging system of claim 8, wherein the first lens has a convex object-side surface.

10. The optical imaging system of claim 8, wherein the second lens has a convex object-side surface.

11. The optical imaging system of claim 8, wherein the third lens has a convex object-side surface.

12. The optical imaging system of claim 8, wherein the fourth lens has a convex object-side surface.

13. The optical imaging system of claim 8, wherein the sixth lens has a concave object-side surface.

* * * * *